US009674432B2

(12) United States Patent
Masugi et al.

(10) Patent No.: US 9,674,432 B2
(45) Date of Patent: Jun. 6, 2017

(54) IMAGE CAPTURING APPARATUS

(71) Applicant: OLYMPUS CORPORATION, Shibuya-ku, Tokyo (JP)

(72) Inventors: Tatsuro Masugi, Akiruno (JP); Sumio Kawai, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 249 days.

(21) Appl. No.: 14/312,090

(22) Filed: Jun. 23, 2014

(65) Prior Publication Data
US 2015/0002623 A1 Jan. 1, 2015

(30) Foreign Application Priority Data

Jun. 28, 2013 (JP) .................................. 2013-136289

(51) Int. Cl.
*H04N 5/232* (2006.01)
*G03B 17/02* (2006.01)
*G03B 37/02* (2006.01)

(52) U.S. Cl.
CPC ......... *H04N 5/23238* (2013.01); *G03B 17/02* (2013.01); *G03B 37/02* (2013.01); *H04N 5/23216* (2013.01); *H04N 5/23219* (2013.01); *H04N 5/23241* (2013.01); *G03B 2205/0069* (2013.01)

(58) Field of Classification Search
CPC .................................................. H04N 5/23238
See application file for complete search history.

(56) References Cited

U.S. PATENT DOCUMENTS

| 4,670,648 A * | 6/1987 | Hall .......................... G01S 5/16 250/216 |
| 2008/0158355 A1* | 7/2008 | Jodan ................... H04N 5/2259 348/143 |
| 2010/0073555 A1* | 3/2010 | Li ......................... H04N 5/2252 348/376 |
| 2012/0223588 A1* | 9/2012 | Suzuki .................... H02J 5/005 307/104 |
| 2013/0210563 A1* | 8/2013 | Hollinger ............. H04N 5/2252 473/570 |

FOREIGN PATENT DOCUMENTS

| CN | 2689286 Y | 3/2005 |
| CN | 202759517 U | 2/2013 |
| JP | 2003244511 A | 8/2003 |

OTHER PUBLICATIONS

Chinese Office Action (and English translation thereof) dated Dec. 30, 2016 issued in counterpart Chinese Application No. 201410301381.7.

\* cited by examiner

*Primary Examiner* — Dave Czekaj
*Assistant Examiner* — Berteau Joisil
(74) *Attorney, Agent, or Firm* — Holtz, Holtz & Volek PC

(57) ABSTRACT

An image capturing apparatus includes a main body and a rotatable image capturing unit. The main body includes a spherical portion having at least three support points. The rotatable image capturing unit includes an image capturing optical system, and is configured to rotationally move while being supported by the support points. In the rotatable image capturing unit, a gravitational point is located so as to overlap a center of gravity of a polygonal plane formed by connecting the support points and present on a side closer to an image sensor the polygonal plane in a direction perpendicular to the polygonal plane.

13 Claims, 25 Drawing Sheets

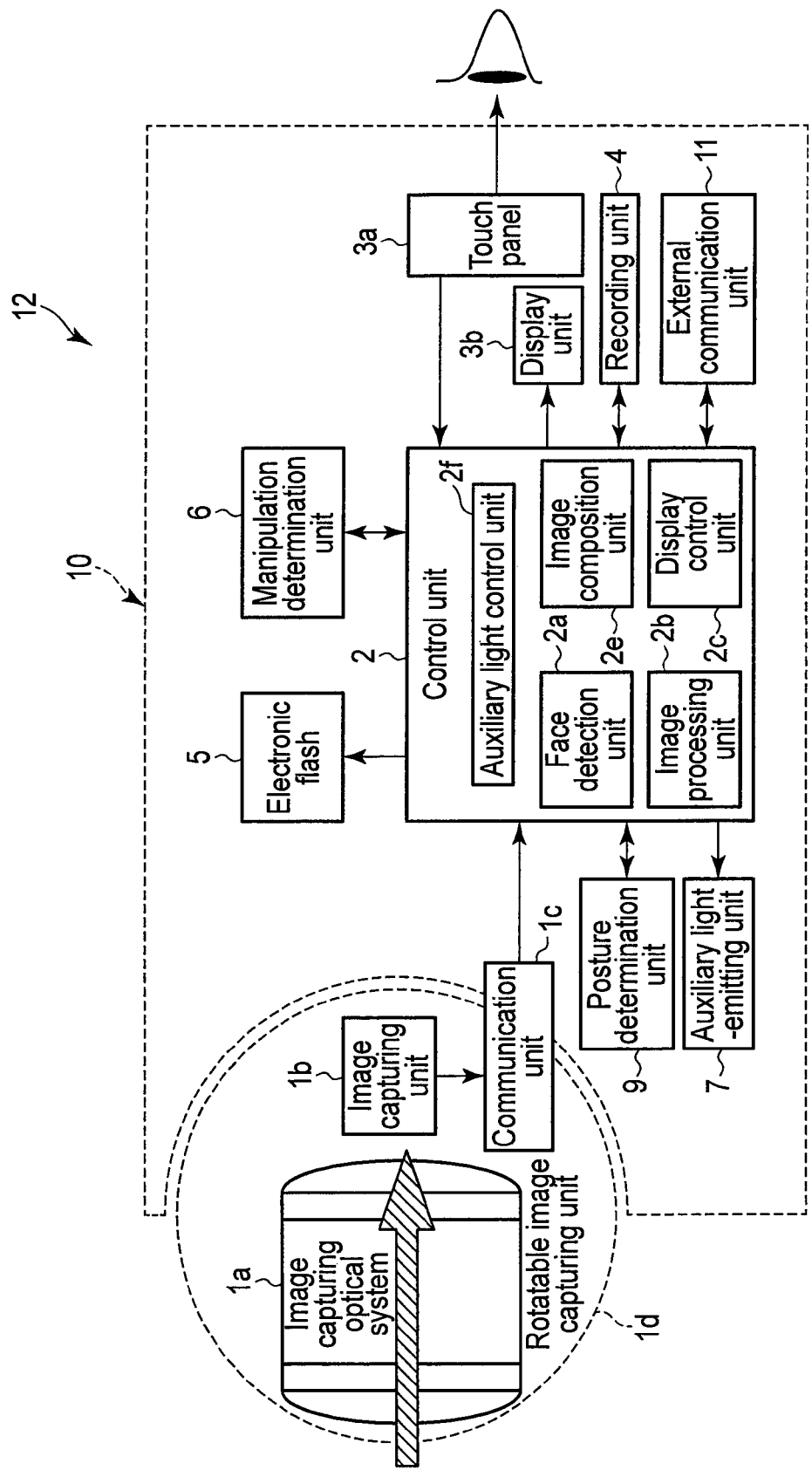
F I G. 1

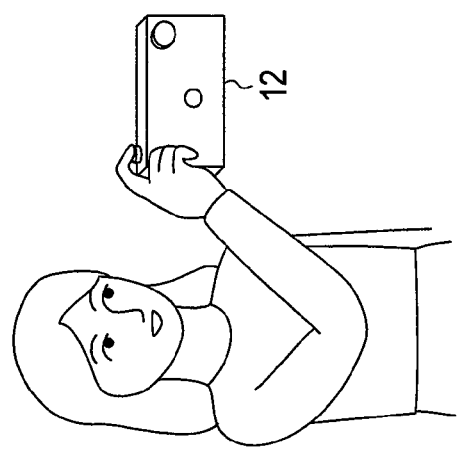
F I G. 4C
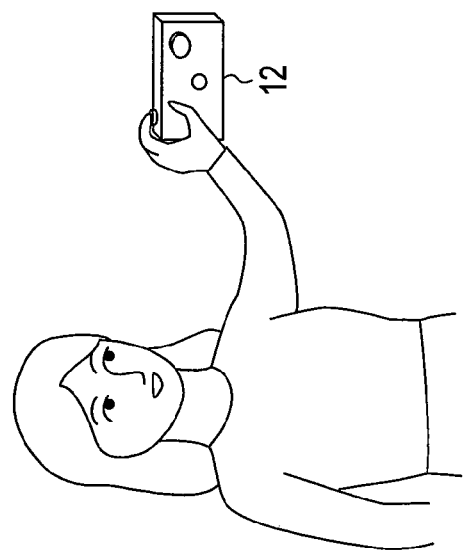
F I G. 4B
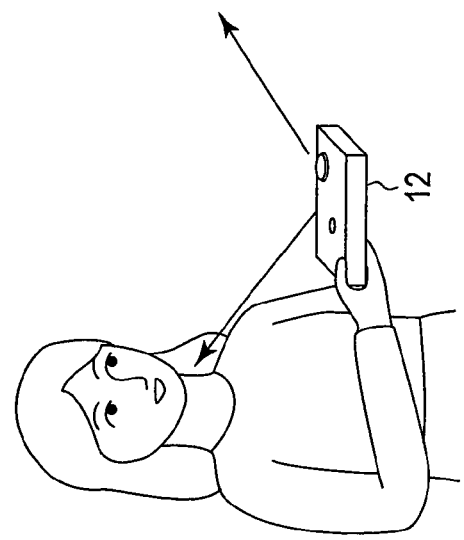
F I G. 4A

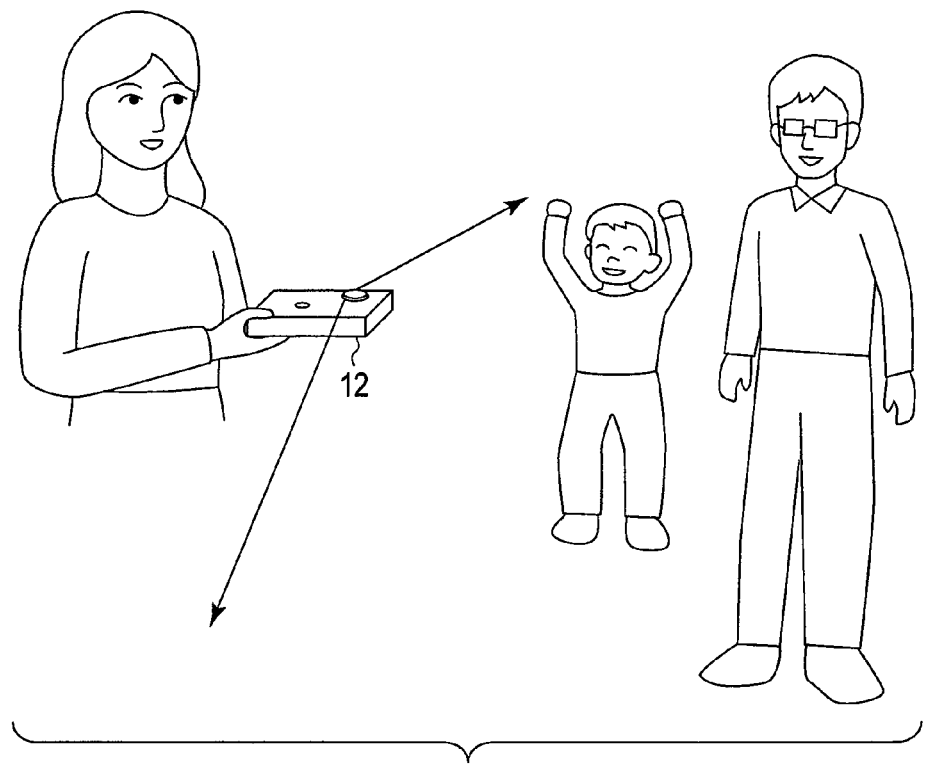
F I G. 5A
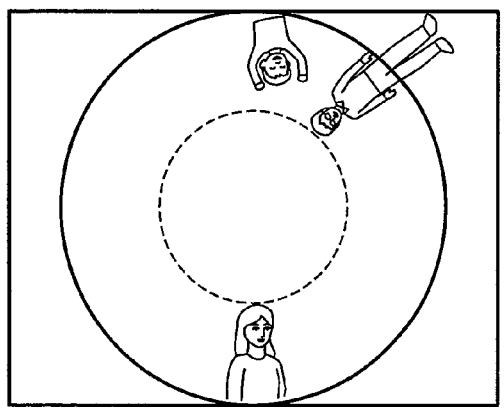
F I G. 5B
F I G. 5C

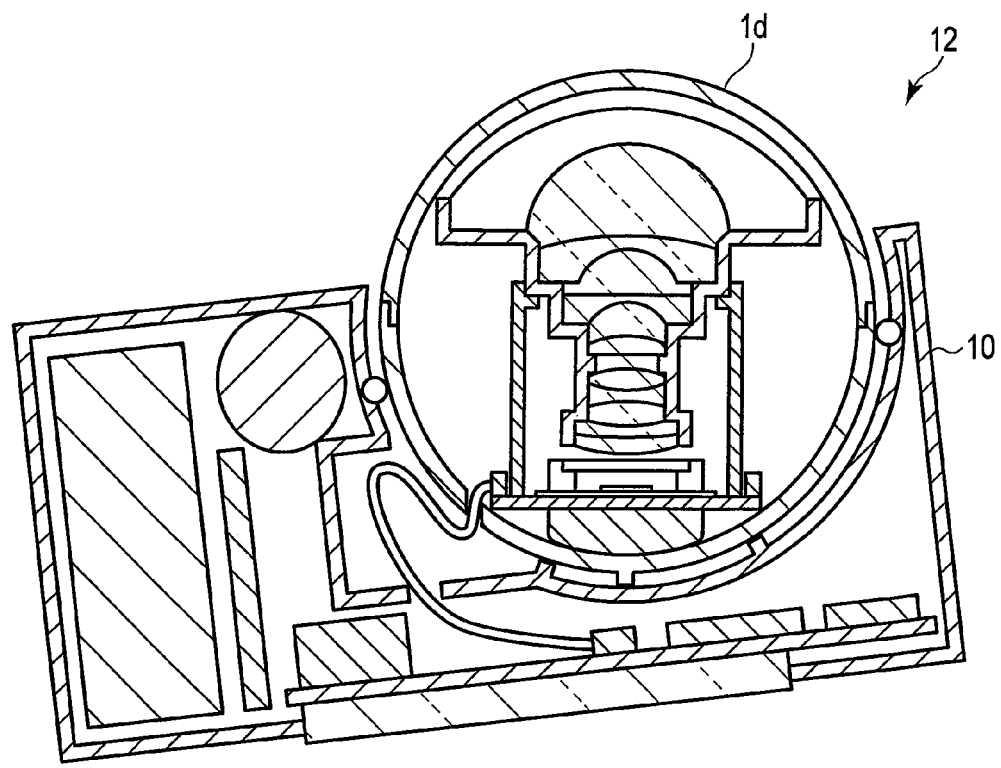
F I G. 10A
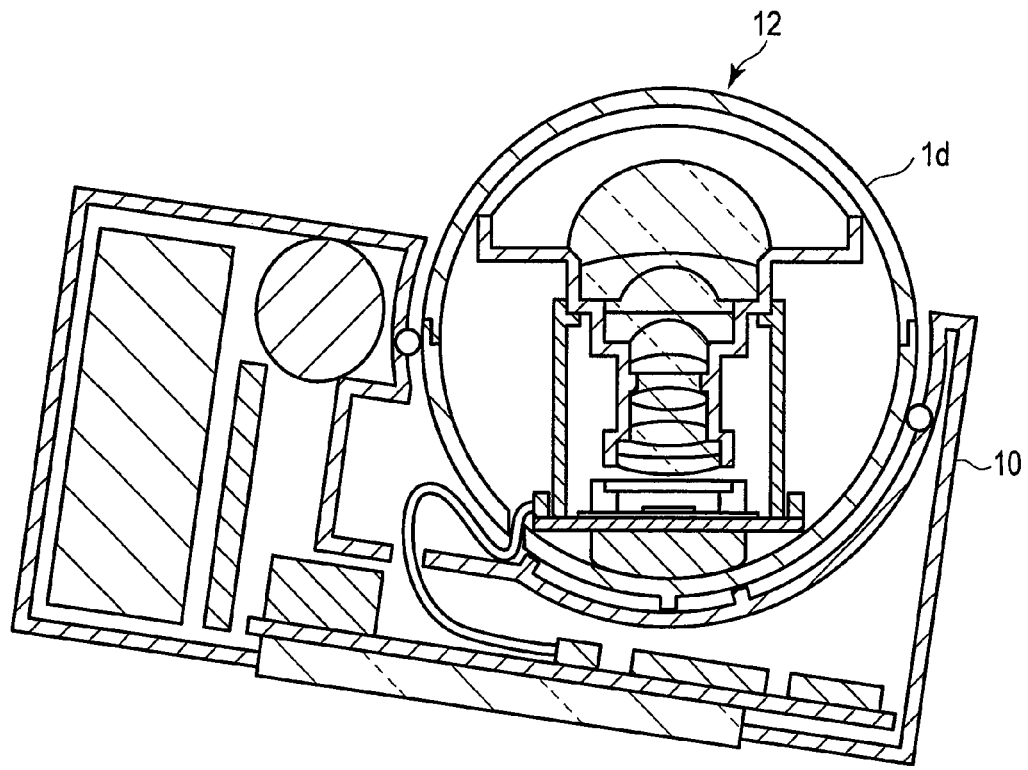
F I G. 10B

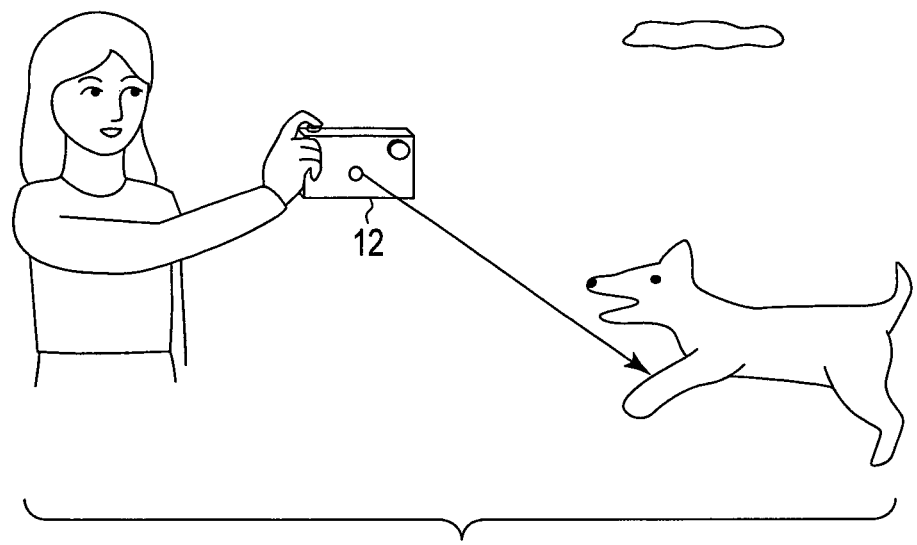
F I G. 11C
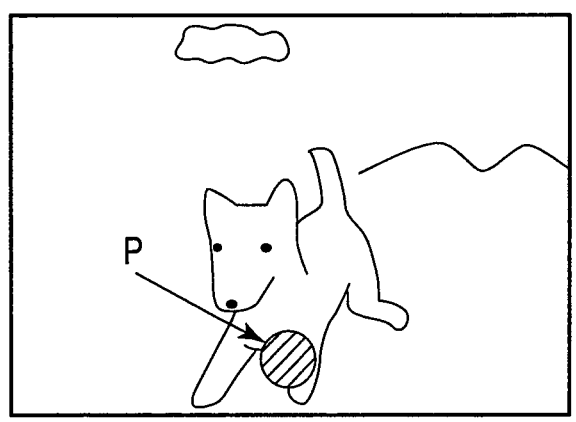
F I G. 11D

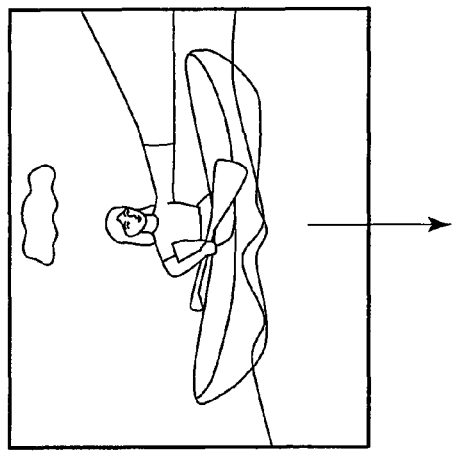
F I G. 14B
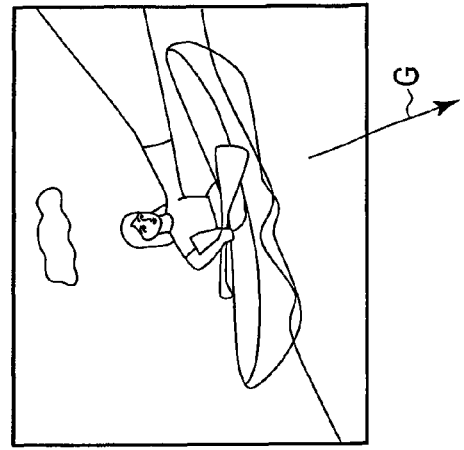
F I G. 14C
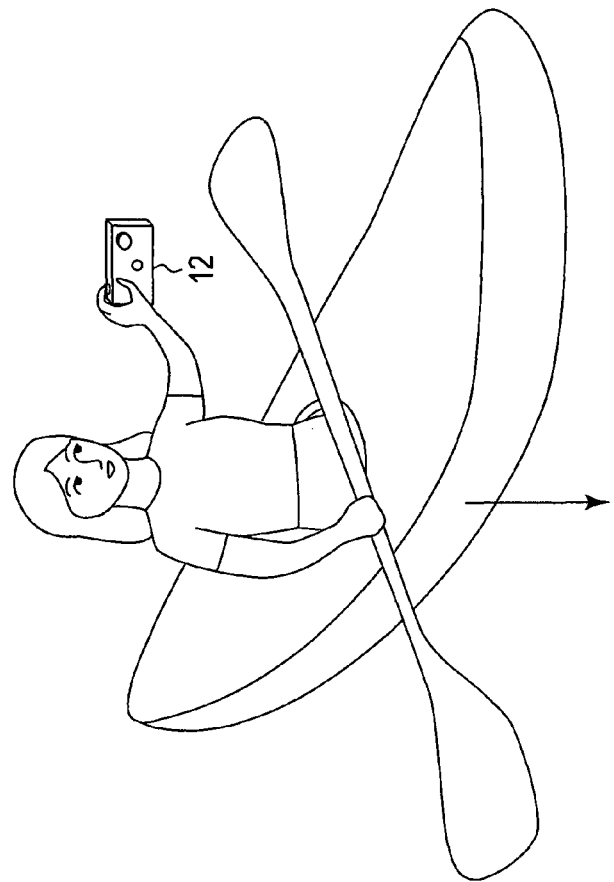
F I G. 14A

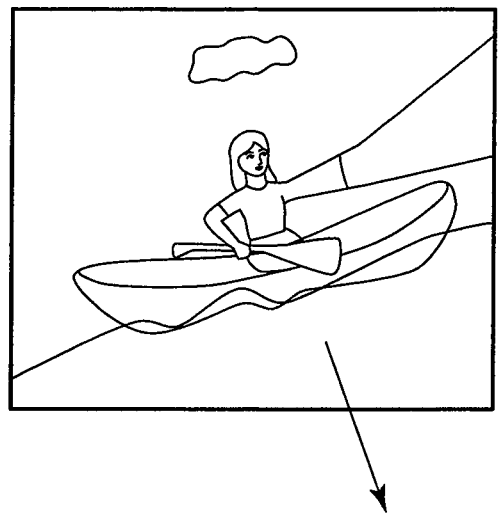
F I G. 15A
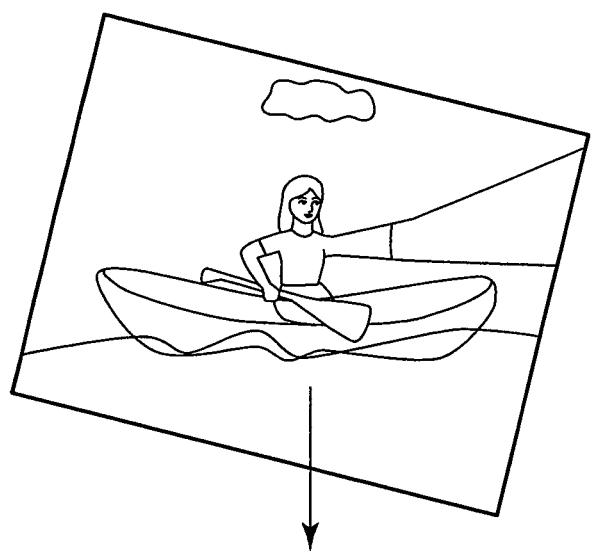
F I G. 15B

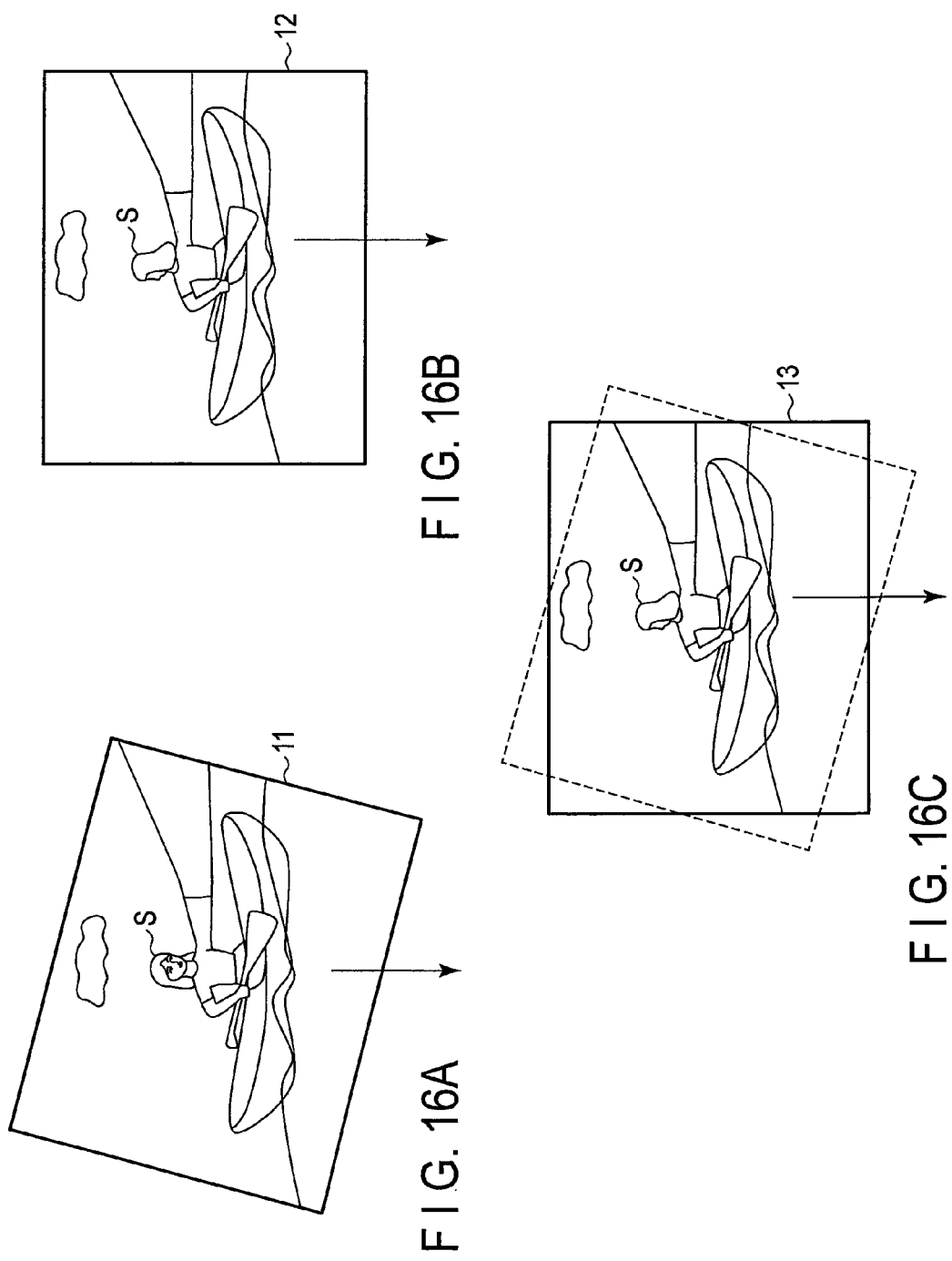

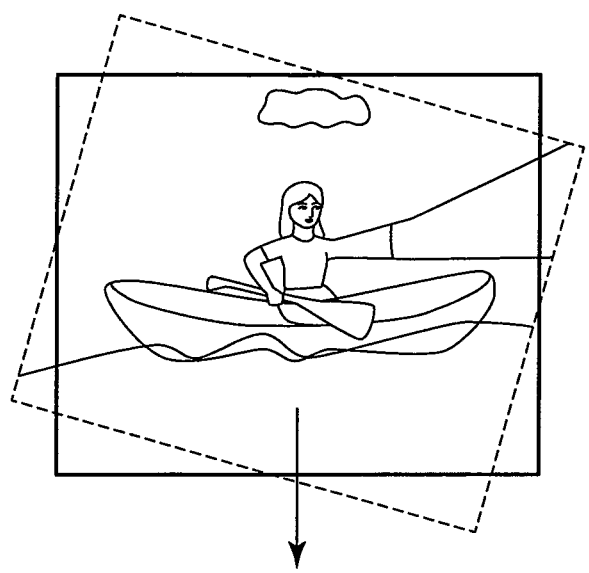
F I G. 18A
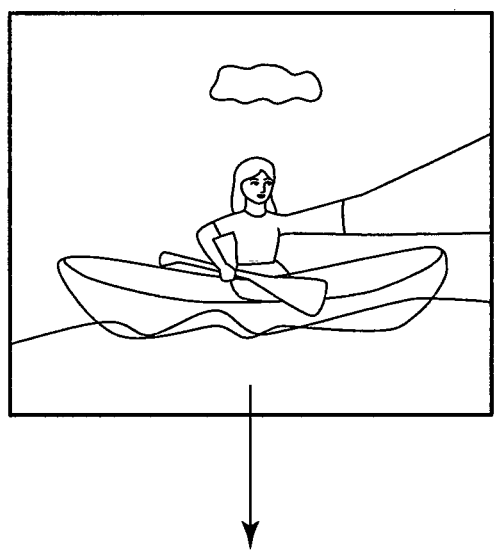
F I G. 18B

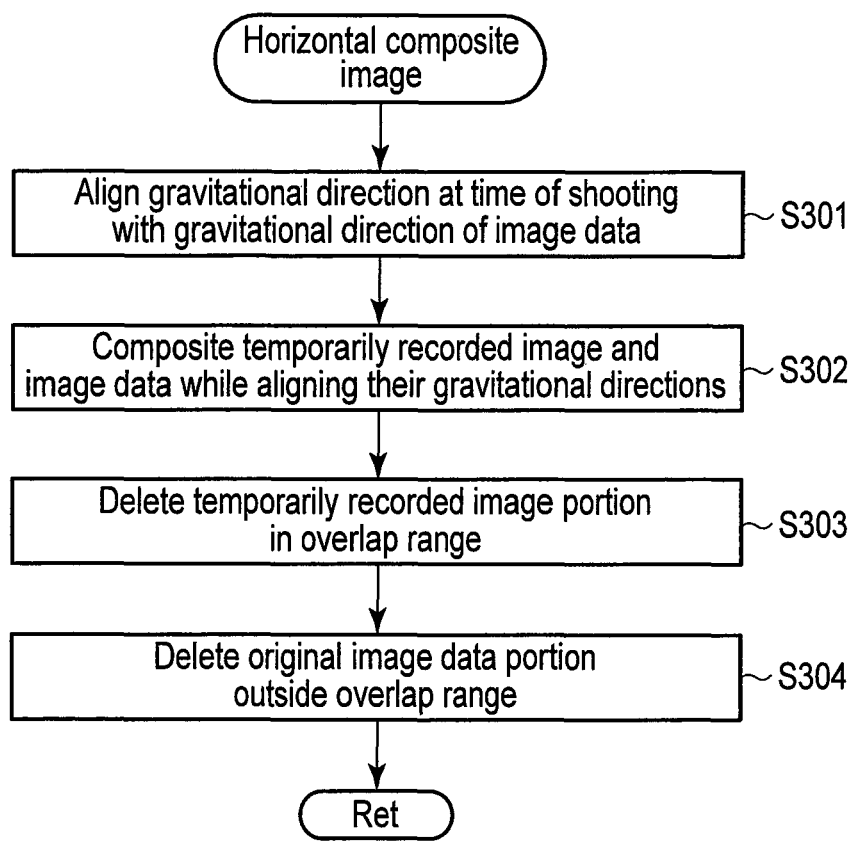
F I G. 19

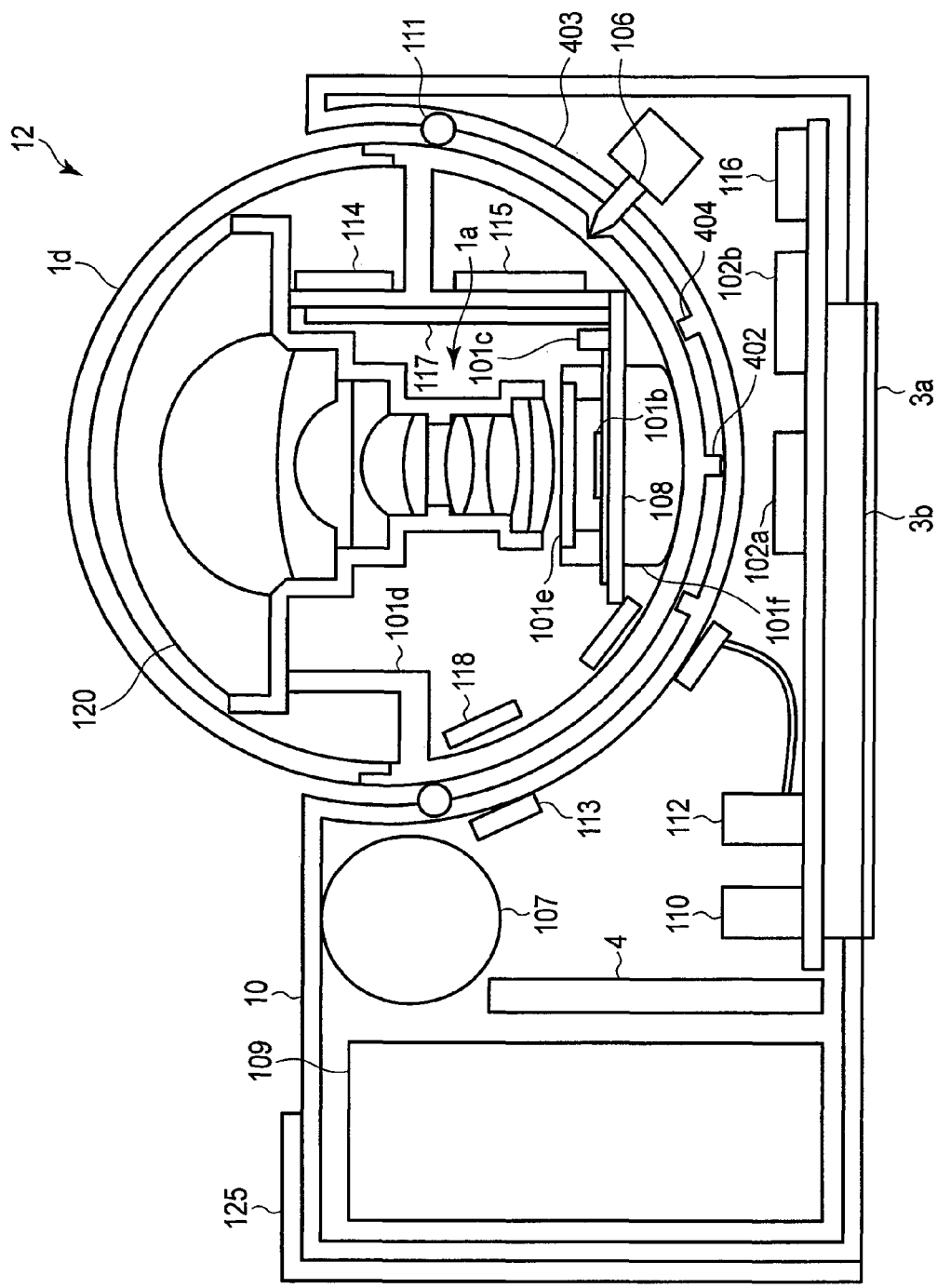
F I G. 20

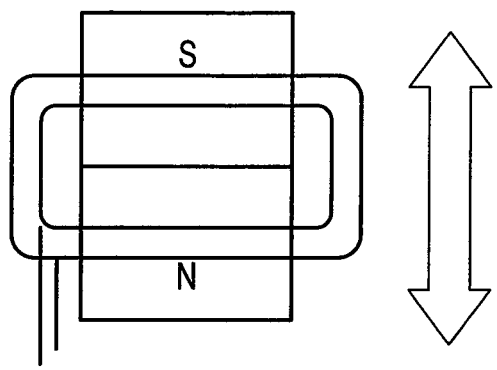
F I G. 22A
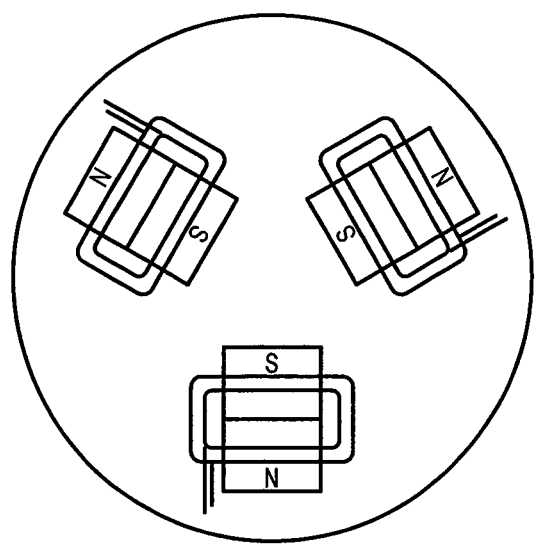
F I G. 22B

IMAGE CAPTURING APPARATUS

CROSS-REFERENCE TO RELATED APPLICATIONS

This application is based upon and claims the benefit of priority from the prior Japanese Patent Application No. 2013-136289, filed Jun. 28, 2013, the entire contents of which are incorporated herein by reference.

BACKGROUND OF THE INVENTION

1. Field of the Invention

The present invention relates to an image capturing apparatus.

2. Description of the Related Art

A method of acquiring an image including objects in all directions has conventionally been proposed. An image including objects in all directions can be acquired by, for example, repeating shooting while rotating an image capturing apparatus held by a user through 360°. More specifically, the user can create an image including objects in all directions by combining photos acquired by this method. In this method, a time lag occurs between the photo at the start of shooting and the photo at the end of shooting.

Jpn. Pat. Appln. KOKAI Publication No. 2003-244511 proposes an image capturing apparatus including a plurality of image capturing apparatuses arranged so as to make a plurality of optical axes face in radial directions, a release button configured to simultaneously release the plurality of image capturing apparatuses, and a composition processing unit configured to combine a plurality of images acquired by the plurality of image capturing apparatuses. This image capturing apparatus also includes a level, and an LCD monitor capable of displaying the image of an arbitrary one of the plurality of fixed focus digital cameras. Using the level and the LCD monitor, the user can make the image capturing apparatus level while viewing the LCD monitor. The image capturing apparatus having the above-described functional arrangement can simultaneously shoot objects in all directions while keeping the image capturing apparatus level, and automatically create a panoramic image.

There also exists a method of shooting all directions in the angle of view by using a wide-field lens such as a fisheye lens facing the zenith. To keep the optical axis of the wide-field lens almost facing the zenith, the user needs to frequently adjust the tilt of the image capturing apparatus including the wide-field lens.

BRIEF SUMMARY OF THE INVENTION

An image capturing apparatus according to a first aspect of the invention comprises: a main body including a spherical portion having at least three support points; and a rotatable image capturing unit including an image capturing optical system for shooting an object and acquiring image data, the rotatable image capturing unit being configured to rotationally move while being supported by the support points, in which a gravitational point is located so as to overlap a center of gravity of a polygonal plane formed by connecting the support points and present on a side closer to an image sensor than the polygonal plane in a direction perpendicular to the polygonal plane.

An image capturing apparatus according to a first aspect of the invention comprises: a main body including a spherical portion having at least three support points; a rotatable image capturing unit incorporating an image capturing optical system for shooting an object and acquiring image data, in which an optical axis of the image capturing optical system is located so as to overlap a center of gravity of a polygonal plane formed by connecting the support points; and an autonomous moving unit configured to rotationally move the rotatable image capturing unit kept supported by the support points and to make the optical axis of the image capturing optical system face a zenith.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute apart of the specification, illustrate embodiments of the invention, and together with the general description given above and the detailed description of the embodiments given below, serve to explain the principles of the invention.

FIG. 1 is a block diagram showing the arrangement of an image capturing apparatus according to an embodiment of the present invention;

FIG. 4A is a view showing a state in which a user shoots an object by the right hand;

FIG. 4B is a view showing a state in which a user performs self portrait photography by the left hand;

FIG. 4C is a view showing a state in which a user shoots the zenith direction using an image capturing apparatus including a fisheye lens;

FIG. 5A is a view showing an example of omnidirectional shooting;

FIG. 5B is a view showing a circular image obtained by omnidirectional shooting;

FIG. 5C is a view showing a panoramic image obtained by processing the circular image;

FIG. 10A is a view for explaining an example of the operation of the unlocked rotatable image capturing unit;

FIG. 10B is a view for explaining another example of the operation of the unlocked rotatable image capturing unit;

FIG. 11C is a view showing a state in which an object difficult to shoot is irradiated with guide light;

FIG. 11D is a view showing a shooting result obtained by shooting the object difficult to shoot while irradiating it with guide light;

FIG. 13B is a view showing an example of a manipulation of touching one portion of the touch panel by the left hand, and the like;

FIG. 14A is a view showing an example in which a user in a canoe performs self-portrait photography;

FIG. 14B is a view showing an example in which the gravitational direction at the time of shooting matches the gravitational direction of image data;

FIG. 14C is a view showing an example in which the gravitational direction at the time of shooting does not match the gravitational direction of image data;

FIG. 15A is a view showing an example in which image data whose gravitational direction does not match the gravitational direction of the image capturing apparatus is tilted in the gravitational direction of the image data;

FIG. 15B is a view showing a composition procedure of tilting image data;

FIG. 16A is a view showing image data tilted for composition;

FIG. 16B is a view showing horizontal image data for composition;

FIG. 16C is a view showing an example in which the tilted image data and the horizontal image data are composed;

FIG. 18A is a view showing deletion of unnecessary portions near ends in composition;

FIG. 18B is a view showing composite image data;

FIG. 19 is a flowchart for explaining details of image data composition;

FIG. 20 is a view showing an example of the arrangement of an image capturing apparatus according to the first modification of an embodiment of the present invention;

FIG. 22A is a view for explaining the operation of a voice coil motor;

FIG. 22B is a view for explaining voice coil motors attached to a rotatable image capturing unit.

DETAILED DESCRIPTION OF THE INVENTION

First Embodiment

Figure 2:
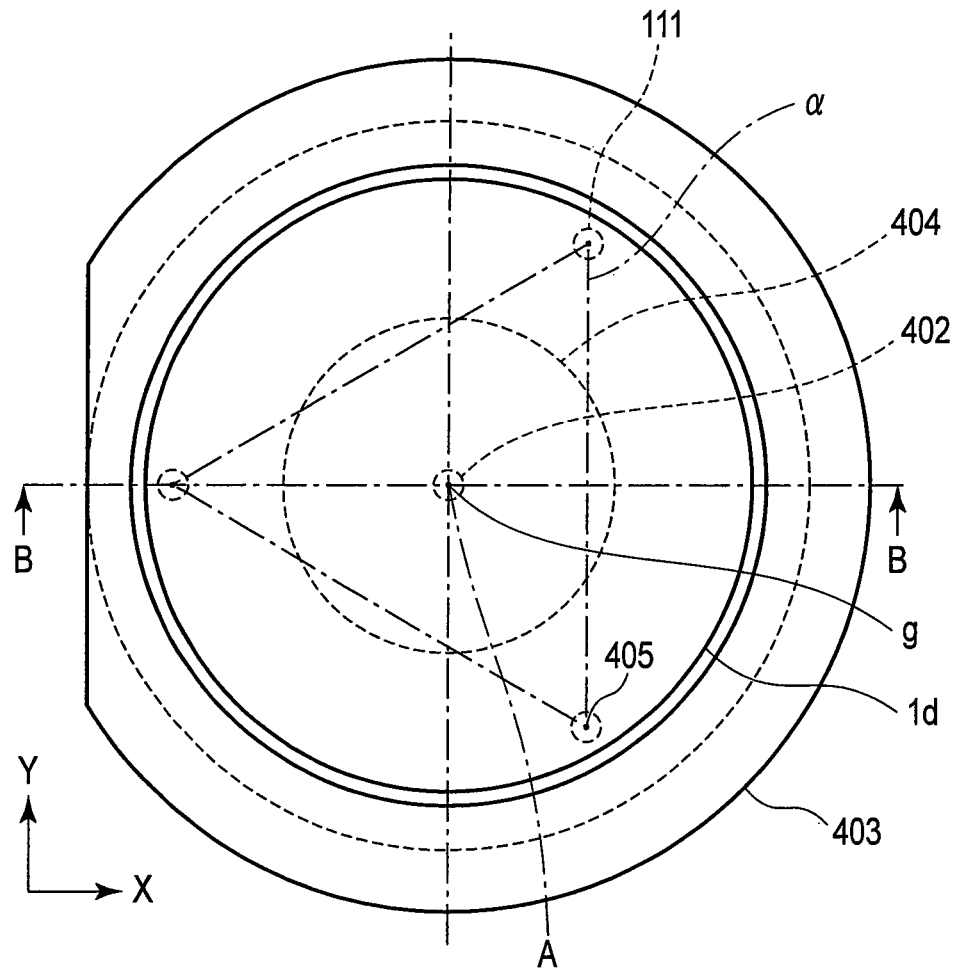
FIG. 2 is a plan view showing an example of the arrangement of a rotatable image capturing unit 1d.

The first embodiment of the present invention will now be described with reference to FIGS. 1, 2, 3, 4A, 4B, 4C, 5A, 5B, 5C, 6A, 6B, 7A, 7B, 8, 9A, 9B, 10A, 10B, 11A, 11B, 11C, 11D, 12, 13A, 13B, 13C, 14A, 14B, 14C, 15A, 15B, 16A, 16B, 16C, 17A, 17B, 18A, 18B, and 19. An example of the arrangement of an image capturing apparatus 12 according to the first embodiment of the present invention will be described with reference to FIG. 1. The image capturing apparatus 12 includes a rotatable image capturing unit 1d configured to make the optical axis of a lens face the zenith, and a main body 10 that holds the rotatable image capturing unit 1d.

The rotatable image capturing unit 1d has a spherical shape, and includes an image capturing optical system 1a, an image capturing unit 1b, and a communication unit 1c. The image capturing optical system 1a includes a plurality of lenses functioning as a fisheye lens, and captures light in a wide field around the optical axis. The image capturing unit 1b converts the light captured by the image capturing optical system 1a into a digital signal (image data). The communication unit 1c transmits the image data to the main body 10 by performing wired or wireless communication with the main body 10.

The main body 10 holds the rotatable image capturing unit 1d, and includes an auxiliary light-emitting unit 7, a control unit 2, a display unit 3b, a recording unit 4, a touch panel 3a, a manipulation determination unit 6, an electronic flash 5, a posture determination unit 9, and an external communication unit 11.

The auxiliary light-emitting unit 7 emits guide light. The guide light is, for example, a laser beam. The guide light is used to cause the user to confirm that a predetermined object exists in the angle of view.

The control unit 2 includes a face detection unit 2a, an image processing unit 2b, a display control unit 2c, an image composition unit 2e, and an auxiliary light control unit 2f. The face detection unit 2a detects a face from image data. The image processing unit 2b performs white balance correction, gamma correction, and the like. The display control unit 2c causes the display unit 3b to display an image based on image data processed by the image processing unit 2b. The image composition unit 2e calculates corresponding pixel values of two pieces of image data and outputs one piece of composite image data. The image composition unit 2e performs correction of the tilt of image data and trimming of image data. The auxiliary light control unit 2f controls light emission of the auxiliary light-emitting unit 7. The auxiliary light control unit 2f controls guide light irradiation. The auxiliary light-emitting unit 7 projects guide light to, for example, an object at an end of the angle of view. The user can know the range of the angle of view by the guide light projected to the end of the angle of view.

The display unit 3b is, for example, a liquid crystal display or an organic EL, and displays an image under the control of the display control unit 2c. The recording unit 4 is, for example, a ROM, and records image data. The touch panel 3a detects a touched position, and inputs an electrical signal according to the touched position to the control unit 2. The manipulation determination unit 6 is, for example, a button configured to detect pressing and output a predetermined signal, for example, a release button. The release button is arranged at a position of the main body 10 easy for the user to manipulate by the right hand. The electronic flash 5 emits light when, for example, the luminance of an object is low. The posture determination unit 9 includes, for example, 3-axes acceleration sensors, and determines a change in the posture of the image capturing apparatus 12. The external communication unit 11 transmits data to an external terminal via wired communication or wireless communication by Wi-Fi or the like.

An example of the structure of the rotatable image capturing unit 1d and its peripheral portion will be described with reference to the plan view of FIG. 2. The rotatable image capturing unit 1d is held by a semispherical fixed frame 403 provided in the main body 10. An axis A passes through the center of the semispherical fixed frame 403.

The fixed frame 403 includes a rotation regulation portion 404 and balls 111. The rotation regulation portion 404 projects from the fixed frame 403, and is formed into an annular shape about the axis A. Support points 405 support the rotatable image capturing unit 1d.

A rotation regulation pin 402 is formed on the outer surface of the rotatable image capturing unit 1d. The rotation regulation pin 402 rotationally moves inside the rotatable image capturing unit 1d as the rotatable image capturing unit 1d rotationally moves. The rotatable image capturing unit 1d is limited by the rotation regulation pin 402 and the rotation regulation portion 404 so as to rotationally move inside the rotation regulation portion 404 on the fixed frame 403. That is, the range of the rotational movement is limited so the main body 10 does not hide a fisheye lens 120.

The balls 111 are provided at the three support points 405 on the fixed frame 403. The balls 111 intervene between the fixed frame 403 and the rotatable image capturing unit 1d. The rotatable image capturing unit 1d is smoothly rotationally moved by the balls 111.

A component such as the ball 111 configured to smoothly rotate the rotatable image capturing unit 1d will be referred to as a rotation promoting portion. The rotation promoting portion is not limited to a rolling element such as a ball, and may be configured to slidably move surfaces against each other. A lubricant such as grease may be used for the rotation promoting portion to facilitate the operation.

With the above-described arrangement, the fixed frame 403 can rotatably support the rotatable image capturing unit 1d via the balls 111.

Figure 3:
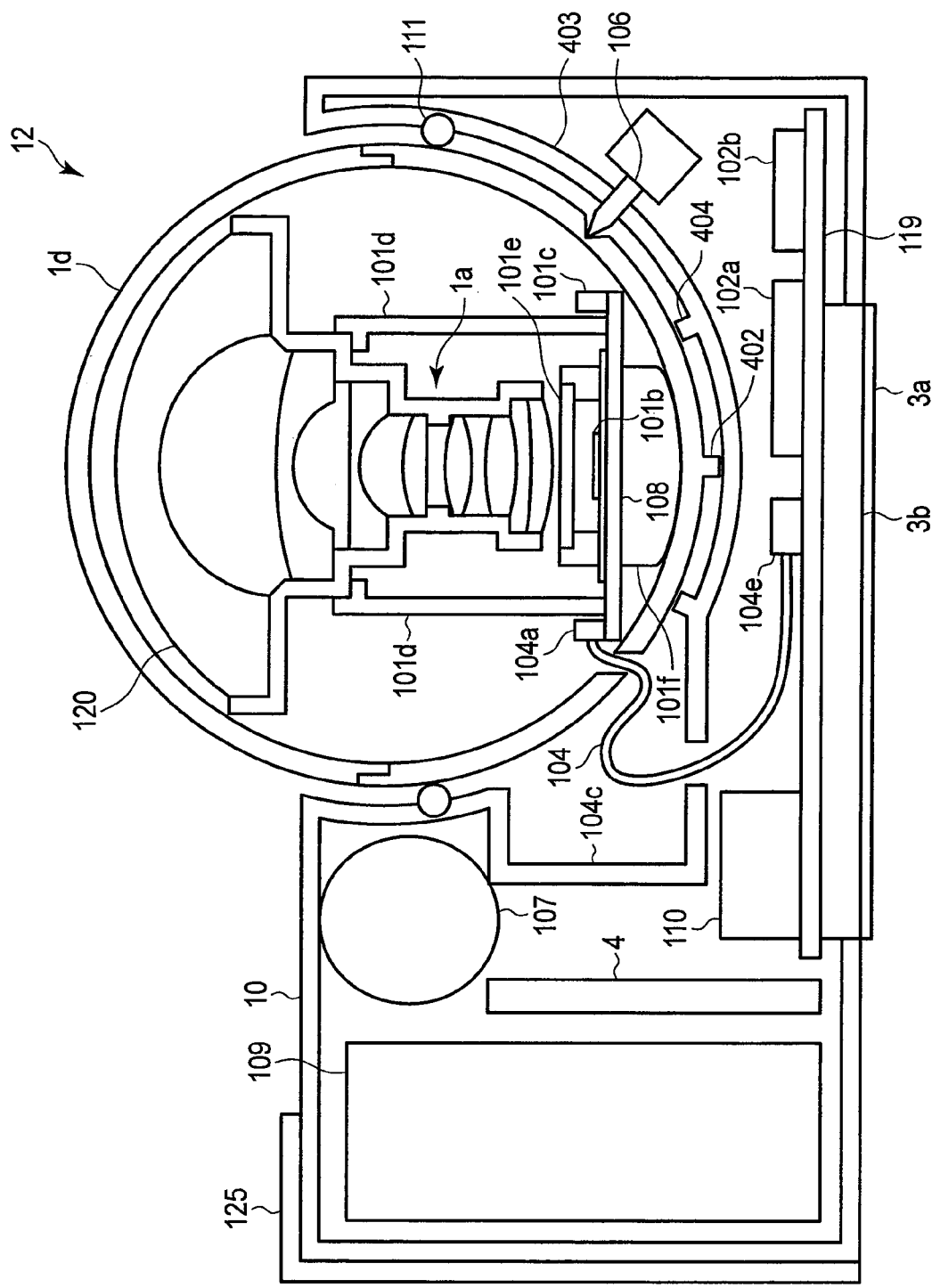
FIG. 3 is a front view for explaining details of the image capturing apparatus.

FIG. 3 is a sectional view of the image capturing apparatus 12 taken along a line B-B in FIG. 2. A detailed example of the arrangement of the image capturing apparatus 12 will be described with reference to FIG. 3. The rotatable image capturing unit 1d specifically includes the image capturing optical system 1a, an image sensor 101b, an A/D conversion circuit 101c, a support portion 101d, a weight 101f, and a connector 104a.

The image capturing optical system 1a includes the fisheye lens 120, and a low-pass filter 101e. The fisheye lens 120 captures light in a wide field, and forms an image on the light-receiving surface (not shown) of the image sensor 101b. The low-pass filter 101e removes high-frequency noise from the light that has entered from the fisheye lens 120.

The image sensor 101b converts an object image based on the light that has entered from the fisheye lens 120 into an electrical signal. The A/D conversion circuit 101c converts the electrical signal into a digital signal (image data). The support portion 101d fixes the fisheye lens 120 in the rotatable image capturing unit 1d. A board 108 is a printed board configured to incorporate electronic components such as an image processing IC 102a. The connector 104a connects the board 108 and a flexible printed board 104b to each other. Note that the image circle of the image capturing optical system 1a is set to be smaller than the image capturing range of the image sensor 101b.

The weight 101f is arranged such that the optical axis of the fisheye lens 120 faces the zenith. The image capturing optical system 1a rotationally moves such that the weight 101f makes its optical axis face the zenith independently of the tilt of the main body 10. Note that the weight 101f is preferably made of a high-density material such as tungsten.

The main body 10 specifically includes the flexible printed board 104b, a connector 104e, a flexible printed board case 104c, a board 119, the image processing IC 102a, a display control IC 102b, the display unit 3b, a lock mechanism 106, the memory card 4, a battery 109, a power supply circuit 110, a grip portion 125, and a main capacitor 107.

The flexible printed board 104b is a flexible board on which wiring configured to transfer image data from the A/D conversion circuit 101c to the image processing IC 102a and the display control IC 102b is printed. The flexible printed board 104b is so short as not to impede the rotational movement of the rotatable image capturing unit 1d.

The flexible printed board case 104c is a case configured to prevent the flexible printed board 104b from coming into contact with other components. The flexible printed board case 104c has sufficient capacity to store the flexible printed board 104b.

The connector 104e connects the flexible printed board 104b and the board 119. The board 119 is a printed board configured to incorporate electronic components such as the image processing IC 102a.

The image processing IC 102a corresponds to the image processing unit 2b, and performs image processing such as white balance correction and gamma correction for image data. The display control IC 102b corresponds to the display control unit 2c, and displays an image on the display unit 3b.

The lock mechanism 106 locks a lock pin provided on it and a concave portion formed in the rotatable image capturing unit 1d. The lock mechanism 106 displaces the lock pin between a state in which the concave portion is locked and a state in which the concave portion is unlocked. When the concave portion is locked by the lock pin, the rotatable image capturing unit 1d is locked by the main body 10. The concave portion and the distal end of the lock pin have, for example, a non-rotational symmetric shape (for example, triangular pyramidal shape) with respect to the axis of the lock pin. When the concave portion and the distal end of the lock pin have a non-rotational symmetric shape, rotation of the lock pin is regulated, and the rotatable image capturing unit 1d is locked by the main body 10 more firmly. The mechanism for locking the rotatable image capturing unit 1d and the main body 10 is not limited to the lock mechanism 106, and may be a magnet, a cord, or a spring. The mechanism for locking the rotatable image capturing unit 1d and the main body 10 will be referred to as a rotation limiting mechanism. Note that upon determining that the image capturing apparatus 12 is facing the zenith for a predetermined time or more, the image capturing apparatus 12 can cancel lock of the lock mechanism, rotationally move the rotatable image capturing unit 1d, and make it face the zenith.

The memory card 4 stores image data. The battery 109 applies a voltage to the power supply circuit 110. The power supply circuit 110 operates the image capturing apparatus 12 by controlling the voltage obtained from the battery 109. The grip portion 125 is an auxiliary member formed outside the main body 10, which is provided to cause the user to stably hold the image capturing apparatus. The main capacitor 107 performs charging to cause the electronic flash 5 to emit light.

Shooting examples according to the purpose or situation of shooting will be described here with reference to FIGS.

4A, 4B, and 4C. In the shooting example shown in FIG. 4A, the user performs a release manipulation by the right hand while viewing the display unit 3*b*. In the shooting example shown in FIG. 4B, the user performs self-portrait photography by the left hand. In the self-portrait photography, the user does not confirm the angle of view. In the shooting example shown in FIG. 4C, the user performs omnidirectional shooting by making the optical axis of the image capturing apparatus including the fisheye lens 120 face the zenith.

An example in which the user performs omnidirectional shooting using the image capturing apparatus including the fisheye lens 120 will be described with reference to FIGS. 5A, 5B, and 5C. In the shooting example shown in FIG. 5A, the user on the left side is shooting three objects including the user herself. When making the optical axis of the fisheye lens 120 face the zenith, the user can shoot the image including the three objects shown in FIG. 5A. The image acquired by this shooting is a circular image including the three objects, as shown in FIG. 5B. The circular image may be generated as a panoramic image by processing using a PC or the like, as shown in FIG. 5C. In the shooting example shown in FIG. 5A, it is difficult for the user to shoot while confirming the angle of view of the image capturing apparatus. Hence, the three objects may be excluded from the image. However, it is difficult for the user to make the optical axis of the image capturing apparatus including the fisheye lens face the zenith. For example, it is difficult for the user to keep the image capturing apparatus level.

An example of the operation of the image capturing apparatus 12 will be described here with reference to the flowchart of FIGS. 6A and 6B. The control unit 2 determines whether a shooting mode is selected (step S100). Upon determining that a shooting mode is not selected (NO in step S100), the control unit 2 selects a reproduction mode. Upon determining that a shooting mode is selected (YES in step S100), the control unit 2 determines whether the optical axis of the rotatable image capturing unit 1*d* faces the zenith (step S101). Upon determining that the optical axis of the rotatable image capturing unit 1*d* faces the zenith (YES in step S101), the control unit 2 causes the process to advance to step S109. Upon determining that the optical axis of the rotatable image capturing unit 1*d* does not face the zenith (NO in step S101), the control unit 2 causes the lock mechanism 106 to lock the rotatable image capturing unit 1*d* (step S102). After step S102, the control unit 2 determines whether the user grips the image capturing apparatus 12 by the left hand (step S103).

Figure 7B:
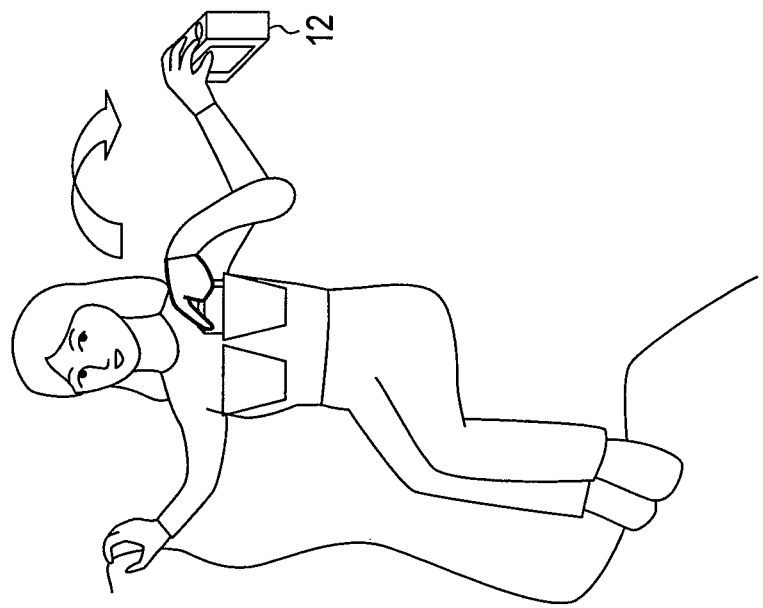
FIG. 7B is a view showing an example in which a general image capturing apparatus is manipulated by the left hand.
Figure 7A:
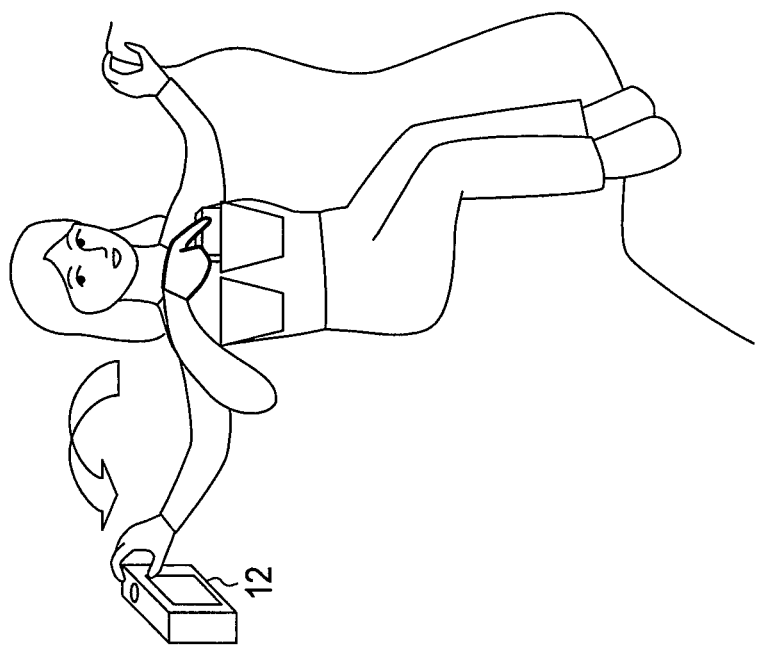
FIG. 7A is a view showing an example in which a general image capturing apparatus is manipulated by the right hand.
Figure 8:
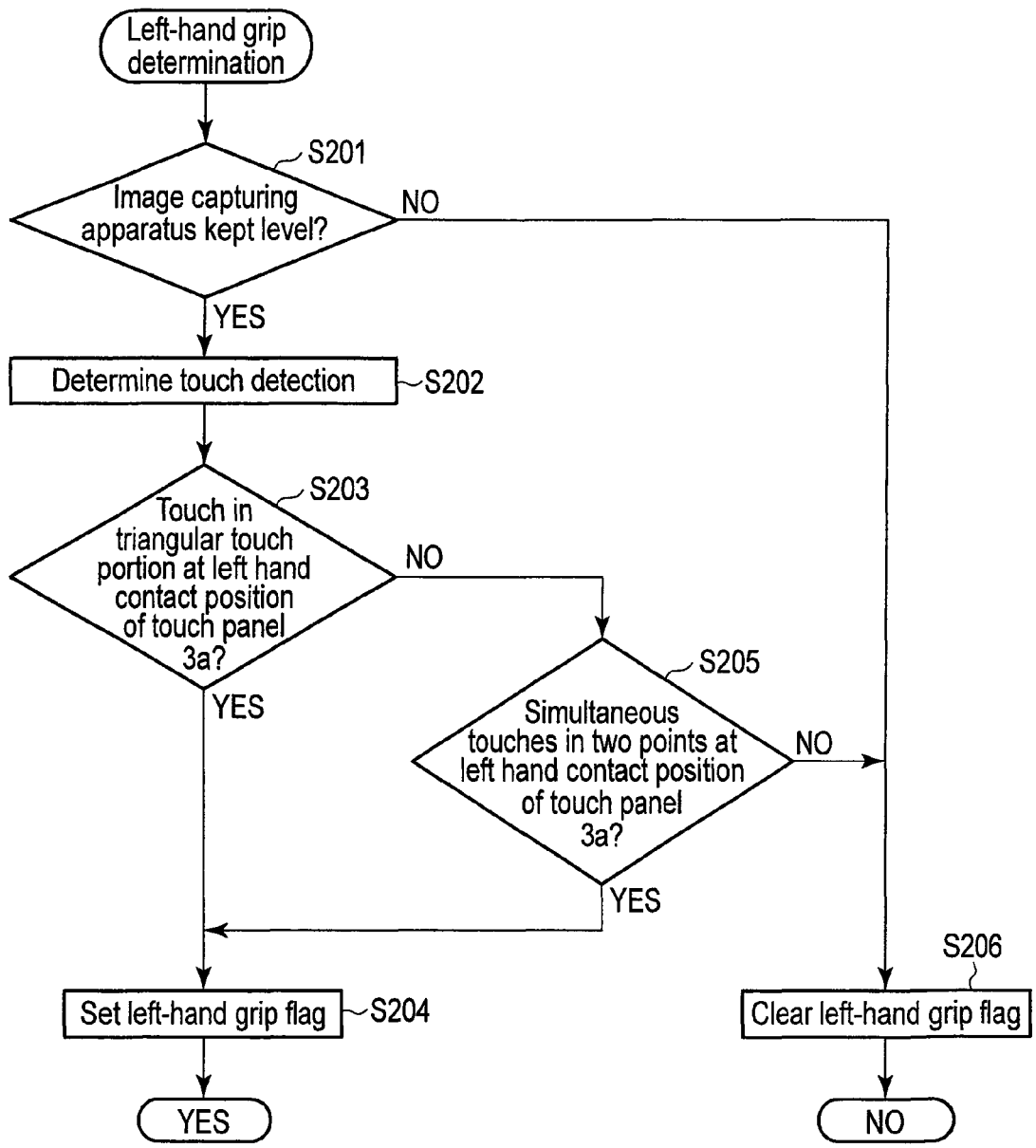
FIG. 8 is a flowchart for explaining details of left-hand grip determination.

The image capturing apparatus 12 according to this embodiment has an arrangement example that allows shooting by the left hand or right hand. Situations where the user grips the image capturing apparatus 12 by one hand will be described with reference to FIGS. 7A and 7B. In FIGS. 7A and 7B, the user shoots while rock-climbing. Referring to FIG. 7A, the user is holding on to the cliff by the left hand and is going to press the release button (not shown) of the image capturing apparatus 12 by the right hand. The manipulation determination unit 6 is configured to be capable of operating by the right hand. The user can easily shoot by the right hand. Referring to FIG. 7B, the user is holding on to the cliff by the right hand and is going to press the release button of the image capturing apparatus 12 by the left hand. In general, however, the release button of the image capturing apparatus is arranged at a position hard to manipulate by the left hand. That is, it is difficult for the user to press the release button by the left hand.

The image capturing apparatus 12 can determine that it is gripped by the left hand. An example of this determination will be described with reference to the flowchart of FIG. 8. Examples of detection of grip by the left hand will be described with reference to FIGS. 9A and 9B.

The control unit 2 determines whether the image capturing apparatus 12 remains level (step S201). Upon determining that the image capturing apparatus 12 remains level (YES in step S201), the control unit 2 starts detecting the touch position on the touch panel 3*a* (step S202). Upon determining that the image capturing apparatus 12 does not remain level, that is, tilts (NO in step S201), the control unit 2 clears a left-hand grip flag to 0 (step S206). The left-hand grip flag is a flag representing that the user is gripping the image capturing apparatus 12 by the left hand. When the left-hand grip flag is 0, the image capturing apparatus 12 is not gripped by the left hand. On the other hand, when the left-hand grip flag is 1, the user is gripping the image capturing apparatus 12 by the left hand. Hence, after step S206, the control unit 2 determines in the left-hand grip determination (step S103) that the user does not grasp the image capturing apparatus 12 by the left hand.

Figure 9A:
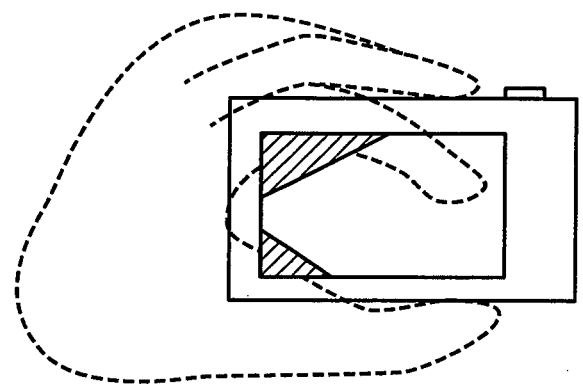
FIG. 9A is a view showing the first example of performing a touch manipulation by the left hand while gripping the image capturing apparatus by the left hand.
Figure 9B:
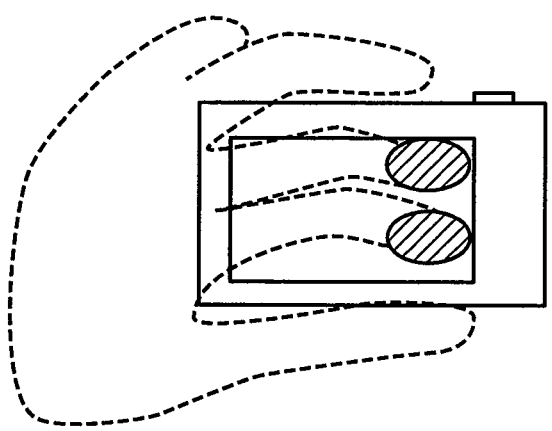
FIG. 9B is a view showing the second example of performing a touch manipulation by the left hand while gripping the image capturing apparatus by the left hand.

After step S202, the control unit 2 determines whether a triangular touch portion of the touch panel 3*a* shown in FIG. 9A is touched. The triangular touch portion is a portion where the user's left palm contacts when the user grasps the image capturing apparatus 12 by the left hand (step S203). Upon determining that the triangular touch portion is touched (YES in step S203), the control unit 2 sets the flag representing that the image capturing apparatus 12 is gripped by the left hand to 1 (step S204). At this time, the control unit 2 determines that the user grasps the image capturing apparatus 12 by the left hand. Upon determining that the triangular touch portion is not touched (NO in step S203), the control unit 2 determines whether simultaneous touches in two touch portions on the touch panel 3*a* shown in FIG. 9B are detected when the user grasps the image capturing apparatus 12 by the left hand in another form (step S205). Upon determining that simultaneous touches in two touch portions on the touch panel 3*a* are detected (YES in step S205), the control unit 2 sets the left-hand grip flag to 1 (step S204). Upon determining that simultaneous touches in two touch portions on the touch panel 3*a* are not detected (NO in step S205), the control unit 2 clears the left-hand grip flag to 0 (step S206).

Figure 6A:
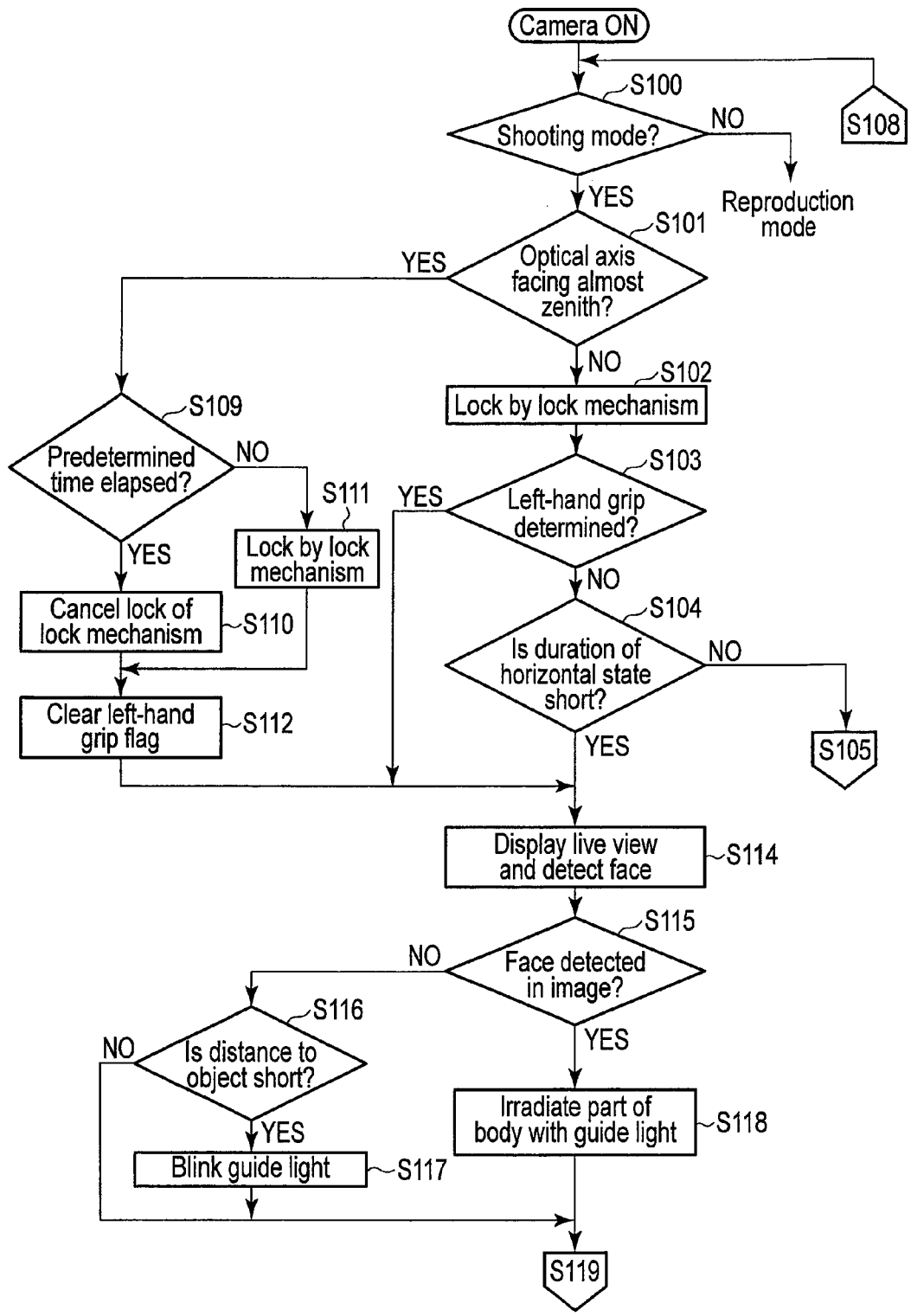
FIG. 6A is a flowchart for explaining the operation of the image capturing apparatus.
Figure 6B:
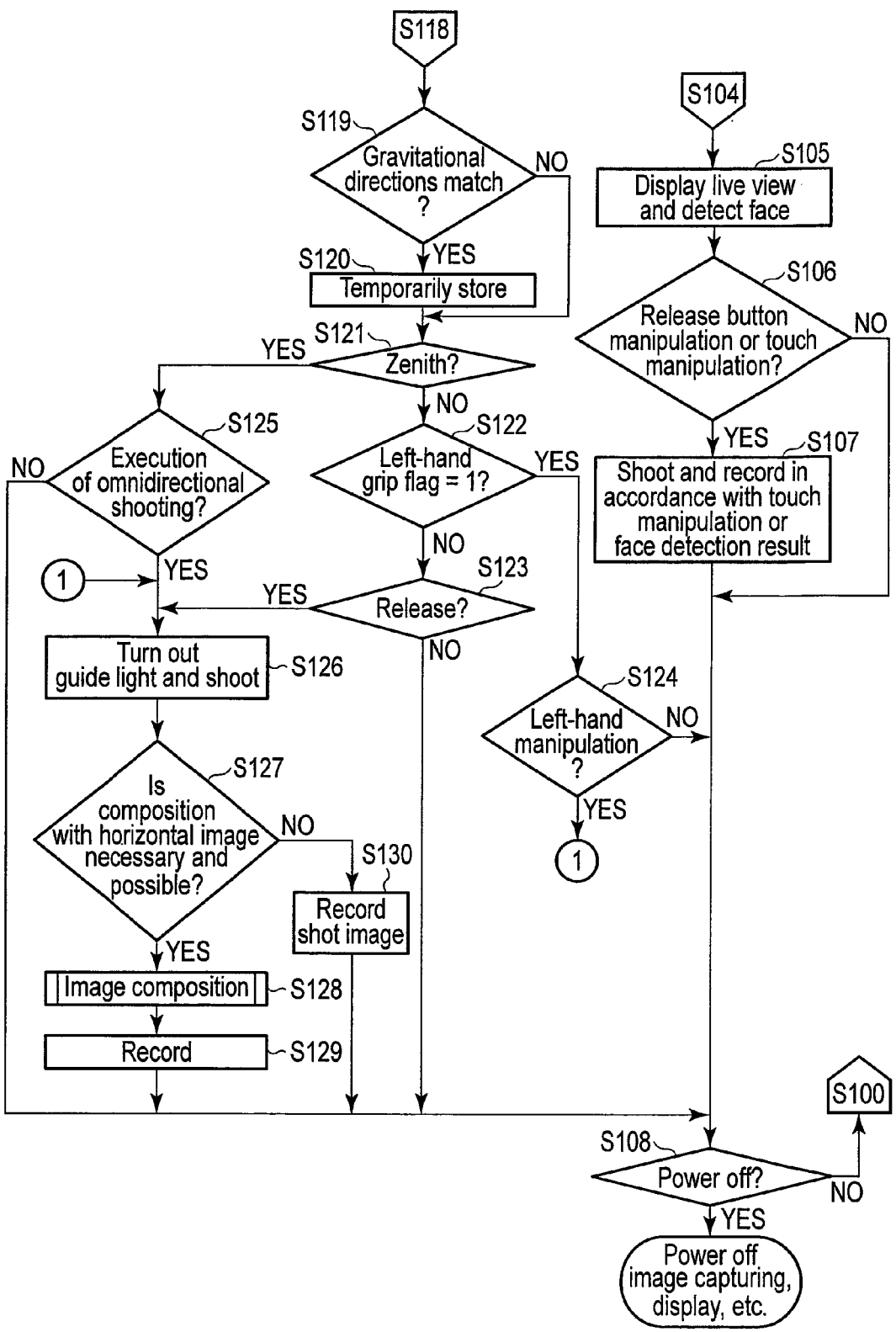
FIG. 6B is a flowchart for explaining the operation of the image capturing apparatus.

Referring to FIGS. 6A and 6B, upon determining that the image capturing apparatus 12 is not gripped by the left hand (NO in step S103), that is, upon determining that the image capturing apparatus 12 is gripped by the right hand, the control unit 2 determines whether the duration of the optical axis horizontal state is shorter than a predetermined time (step S104). Upon determining that the duration of the horizontal state is not shorter than the predetermined time (NO in step S104), the control unit 2 causes the display unit 3*b* to display a live view, and detects the face of an object (step S105). The control unit 2 determines whether the release button or the touch panel 3*a* is manipulated, that is, whether a release manipulation is performed (step S106). Upon determining that the release button or the touch panel 3*a* is not manipulated, the process advances to step S108. Upon determining that the release button or the touch panel 3*a* is manipulated (YES in step S106), the control unit 2 adjusts the focus and exposure for the touch position on the touch panel 3*a* or a face portion detected as the result of face detection, performs shooting, and records image data obtained by the shooting in the recording unit 4 (step S107). After the image data is recorded in the recording unit 4, the control unit 2 determines whether to power off the image capturing apparatus 12. Upon determining to power off (YES in step S108), the processing ends. Upon determining not to power off (NO in step S108), the process returns to step S100.

Upon determining that the optical axis faces the zenith (YES in step S101), the control unit 2 determines whether a predetermined time has elapsed in a state in which the optical axis faces the zenith (step S109). Upon determining that the predetermined time has elapsed in a state in which the optical axis faces the zenith (YES in step S109), the control unit 2 causes the lock mechanism 106 to unlock the rotatable image capturing unit 1d (step S110). When unlocked by the lock mechanism 106, the optical axis of the rotatable image capturing unit 1d faces the zenith independently of the tilt of the main body 10.

The operation of the rotatable image capturing unit 1d after being unlocked by the lock mechanism 106 will be described here with reference to FIGS. 10A and 10B. The lock mechanism 106 locks the rotatable image capturing unit 1d when the image capturing apparatus 12 is not facing the zenith. At this time, the optical axis of the image capturing optical system 1a provided in the rotatable image capturing unit 1d faces the direction of the main body 10. On the other hand, when the predetermined time has elapsed in a state in which the image capturing apparatus 12 faces the zenith (YES in step S109), the lock mechanism 106 unlocks the rotatable image capturing unit 1d (step S110). The position of a center g of gravity of the rotatable image capturing unit 1d is set to make the optical axis face the zenith. For this reason, the optical axis of the image capturing optical system 1a provided in the rotatable image capturing unit 1d faces the zenith independently of the tilt of the main body 10, as shown in FIGS. 10A and 10B.

Upon determining that the time during which the optical axis faces the zenith is shorter than the predetermined time (NO in step S109), the control unit 2 locks the rotatable image capturing unit 1d using the lock mechanism 106 (step S111). If the rotatable image capturing unit 1d is already locked, the control unit 2 causes the lock mechanism 106 to maintain the lock of the rotatable image capturing unit 1d.

After step S111, the control unit 2 clears the left-hand grip flag to 0 (step S112). That is, when omnidirectional shooting is to be performed, the left-hand grip flag is cleared to 0.

Upon determining that the image capturing apparatus 12 is gripped by the left hand (YES in step S103), after clearing the left-hand grip flag to 0 (step S112), or upon determining that the horizontal state duration is shorter than the predetermined time (YES in step S104), the control unit 2 causes the display unit 3b to display a live view, and detects the face of an object (step S114). After that, the control unit 2 determines whether a face is detected from the image data (step S115). Upon determining that a face is detected from the image data (YES in step S115), the control unit 2 causes the auxiliary light-emitting unit 7 to irradiate a predetermined region in the angle of view with guide light (step S118).

The effect of guide light will be described here with reference to FIGS. 11A, 11B, 11C, and 11D. By seeing the guide light that irradiates an object, the user can know various kinds of information concerning shooting. An object is irradiated with the guide light to notify the user that, for example, the object exists in the angle of view.

Figure 11A:
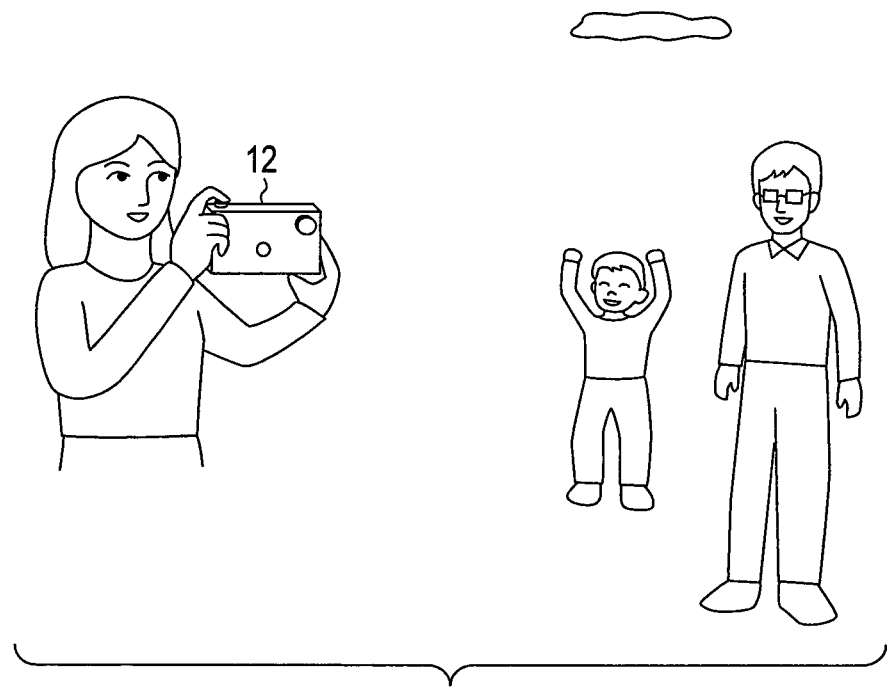
FIG. 11A is a view showing an example of objects easy to shoot.
Figure 11B:
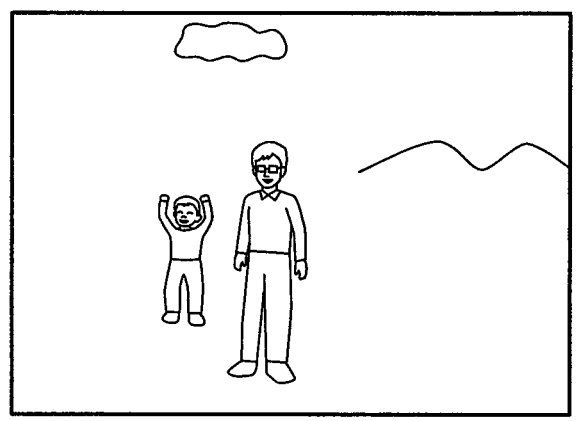
FIG. 11B is a view showing a shooting result obtained by shooting the objects easy to shoot.

In FIG. 11A, the user shoots standing objects. In FIG. 11B, the objects are included in the image. In the shooting situation shown in FIG. 11A, the user can easily acquire the image including the objects in the angle of view, as shown in FIG. 11B, by shooting the objects.

On the other hand, in FIG. 11C, the user shoots a moving object. FIG. 11D shows an image in which the object is irradiated with guide light P. In the shooting situation shown in FIG. 11C, it is difficult for the user to shoot at the instant the moving object is included in the angle of view.

After detecting the face of an object, the image capturing apparatus 12 irradiates the body of the object with the guide light. The guide light irradiates the object when it is included in the angle of view. Hence, without seeing a live view, the user can shoot at the instant the object is included in the angle of view.

Upon determining that the face detection unit 2a does not detect the face of an object (NO in step S115), the control unit 2 determines whether the distance between the object and the image capturing apparatus 12 is shorter than a predetermined distance (step S116). Upon determining that the distance between the object and the image capturing apparatus 12 is shorter than the predetermined distance (YES in step S116), the control unit 2 causes the auxiliary light-emitting unit 7 to emit light and irradiate the object with blinking guide light, thereby notifying the user that the object does not fit in the angle of view.

Note that the guide light irradiation position may be changed in accordance with the application purpose of the guide light. For example, the guide light irradiation positions may be positions corresponding to two ends of the angle of view. Without seeing the display unit 3b, the user can confirm the angle of view or the position of the user in the angle of view by confirming the guide light irradiating the two ends of the angle of view.

After irradiating the object with the guide light (step S118) or after irradiating the object with blinking guide light (step S117), the control unit 2 determines whether the gravitational direction of the image capturing apparatus 12 matches the gravitational direction of the image data obtained for the live view (step S119).

Upon determining that the gravitational direction of the image capturing apparatus 12 matches the gravitational direction of the image data obtained for the live view (YES in step S119), the control unit 2 temporarily stores the image data (step S120). The temporarily stored image data is used for image composition. The temporarily stored image data will be referred to as horizontal image data.

After step S120, the control unit 2 determines whether the optical axis of the image capturing optical system 1a faces the zenith (step S121). Upon determining that the image data of the image capturing optical system 1a faces the zenith (YES in step S121), the control unit 2 determines whether the user is to execute omnidirectional shooting (step S125). Upon determining not to execute omnidirectional shooting (NO in step S125), the control unit 2 determines whether to power off the image capturing apparatus (step S108).

After step S121, upon determining that the optical axis of the image capturing optical system 1a does not face the zenith (NO in step S121), the control unit 2 determines whether the left-hand grip flag is set to 1 (step S122). Upon determining that the left-hand grip flag is set to 1, that is, upon determining that the image capturing apparatus 12 is gripped by the left hand (YES in step S122), the control unit 2 determines whether a release manipulation by the user's left hand is performed (step S124).

Figure 12:
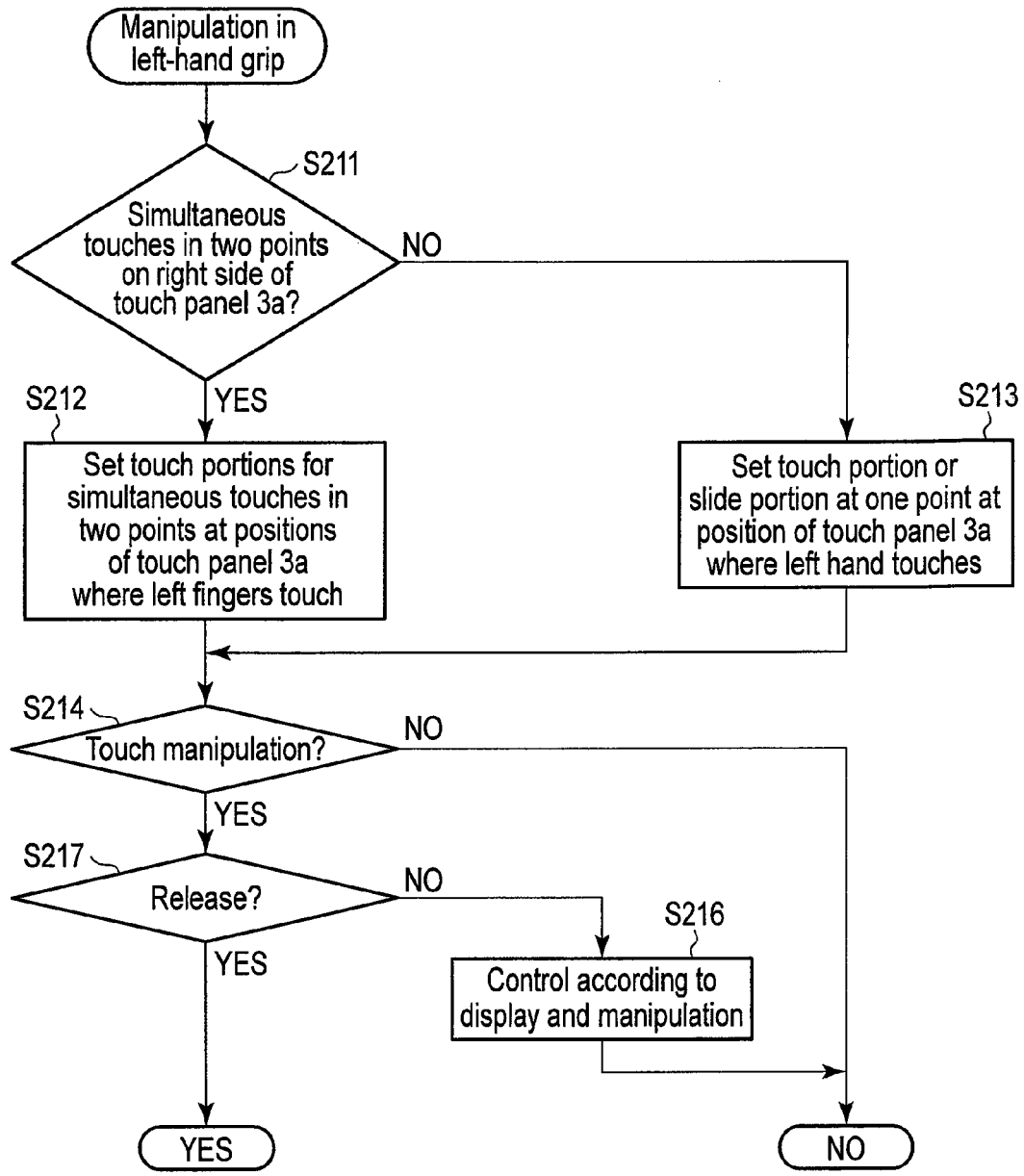
FIG. 12 is a flowchart for explaining an operation of determining a left-hand manipulation.
Figure 13A:
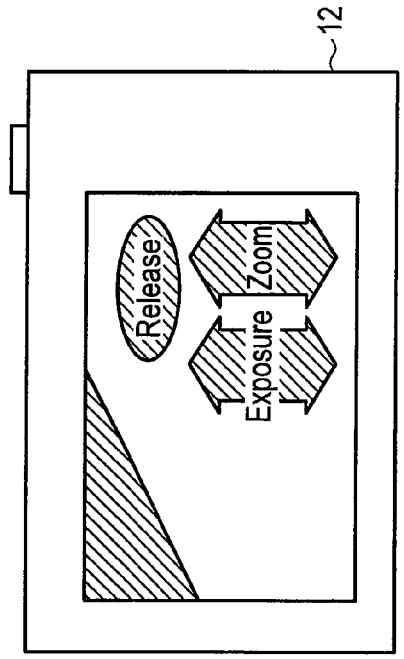
FIG. 13A is a view showing an example of a manipulation of simultaneously touching two portions of a touch panel by the left hand.
Figure 13B:
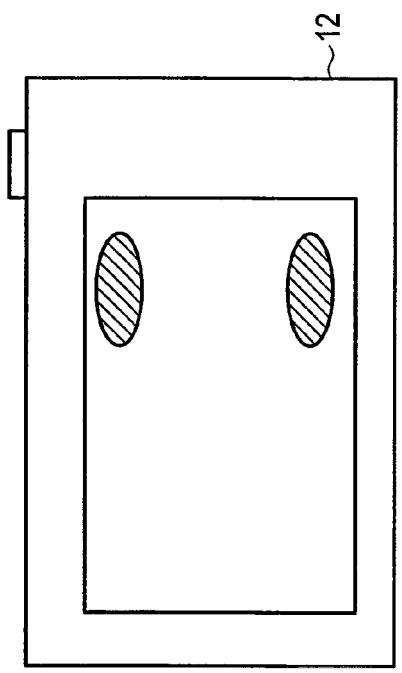
Figure 13C:
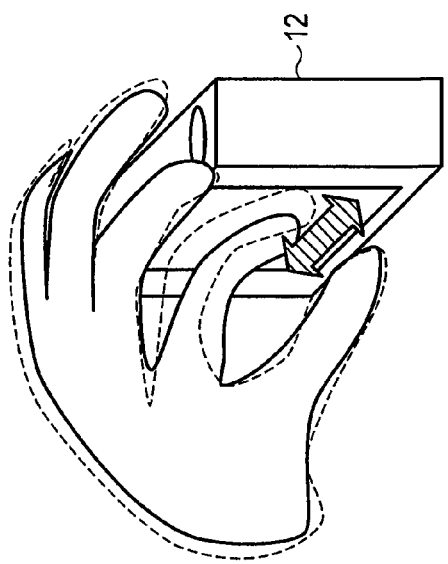
FIG. 13C is a view showing an example of performing a slide manipulation on the touch panel by the left hand.

The determination of the release manipulation by the left hand (step S124) will be described here with reference to the flowchart of FIG. 12 and FIGS. 13A, 13B, and 13C. Referring to FIG. 12, the control unit 2 determines whether it is determined in the left-hand grip determination (step S103) that simultaneous touches in two portions on the touch panel 3a are detected (step S211). Upon determining that simultaneous touches in two portions on the touch panel 3a are detected (YES in step S211), the control unit 2 provides touch portions shown in FIG. 13A, which can perform a release manipulation by detecting simultaneous touches in two portions (step S212). Upon determining that simultaneous touches in two portions on the touch panel 3a are not detected (NO in step S211), the control unit 2 provides touch portions shown in FIG. 13B, which allow the user to perform a release manipulation and the like by touching one touch portion with a finger or sliding a finger on the touch panel 3a (step S213). After providing the touch portions on the touch panel 3a, the control unit 2 determines whether the touch panel 3a is manipulated (step S214). Upon determining that a manipulation of pressing the touch panel 3a with a finger or sliding a finger, as shown in FIG. 13C, is performed (YES in step S214), the control unit 2 determines whether the manipulation is a release manipulation (step S217). Upon determining that the manipulation is a release manipulation (YES in step S217), the control unit 2 determines that the release manipulation by the user's left hand is performed. Upon determining that the manipulation is not a release manipulation (NO in step S217), the control unit 2 performs control according to the contents of the manipulation such as zooming or exposure correction (step S216). The control unit 2 determines that the release manipulation by the user's left hand is not performed. Upon determining that a touch manipulation such as pressing or sliding is not performed (NO in step S214), the control unit 2 determines that the release manipulation by the user's left hand is not performed. At this time, the process advances to step S108.

Upon determining that the left-hand grip flag is not 1 (NO in step S122), that is, when the user grasps the image capturing apparatus 12 by the right hand, the control unit 2 determines whether a release manipulation is performed (step S123).

Upon determining that a release manipulation is performed (YES in step S124 or YES in step S123), the control unit 2 turns out guide light and performs shooting (step S126). Upon turning out guide light and performing shooting (step S126), the control unit 2 determines whether it is necessary and possible to composite image data obtained by temporary storage and image data obtained by shooting (step S127). Note that a situation where composition is necessary is a situation where the gravitational direction at the time of shooting does not match the gravitational direction of image data. A situation where composition is possible is a situation where, for example, image data usable for composition is included in the temporarily stored image data group. Upon determining that it is necessary and possible to composite temporarily stored image data (step S120) and image data obtained by shooting (YES in step S127), the control unit 2 composites the two pieces of image data (step S128). The control unit 2 records the composite image data obtained by composition in the recording unit 4 (step S129).

A situation where image data composition is necessary and an operation of compositing image data will be described here in detail with reference to FIGS. 14A, 14B, 14C, 15A, 15B, 16A, 16B, 16C, 17A, 17B, 18A, 18B, and 19. FIG. 14A illustrates a situation where the user in a canoe shoots herself as an example of a situation where image data composition is necessary. As shown in FIG. 14A, the user in the canoe holds the paddle by the right hand, and therefore performs the release manipulation and the like of the image capturing apparatus by the left hand. In an ideal shooting result in the situation of FIG. 14A, the gravitational direction at the time of shooting matches the gravitational direction of the image data, as shown in FIG. 14B. However, since the situation is unstable, as described above, a shooting result in which the gravitational direction at the time of shooting does not match the gravitational direction of the image data, as shown in FIG. 14C, is often obtained.

The image capturing apparatus 12 according to an embodiment of the present invention composites image data using the image composition unit 2e so as to change the image data obtained at the time of shooting in which the gravitational direction at the time of shooting does not match the gravitational direction of the image data to image data in which the gravitational direction at the time of shooting matches the gravitational direction of the image data.

Figure 17A:
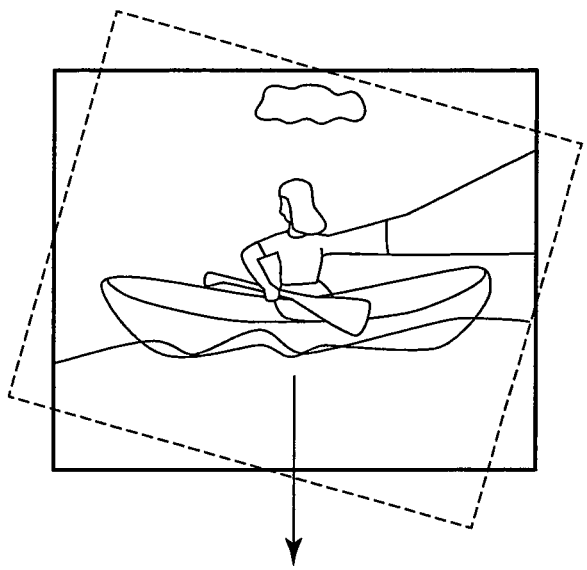
FIG. 17A is a view showing portions where portions unnecessary for composition are deleted.
Figure 17B:
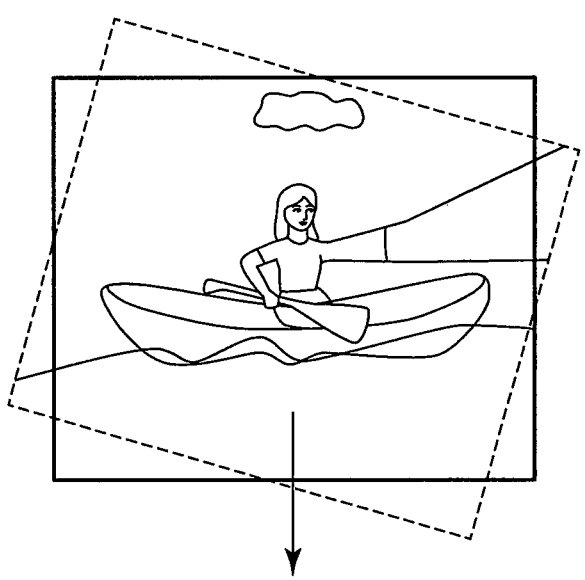
FIG. 17B is a view showing image data after deletion in composition is performed.

An operation of compositing image data will be described with reference to FIGS. 15A, 15B, 16A, 16B, 16C, 17A, 17B, 18A, and 18B and the flowchart of FIG. 19. Upon determining that it is necessary and possible to composite image data (YES in step S127), the control unit 2 matches the gravitational direction (G in FIG. 14C) of image data obtained at the time of shooting with the gravitational direction (for example, downward direction) at the time of shooting, for example, tilts the image data shown in FIG. 15A, in which the gravitational direction of the image data is different from the gravitational direction at the time of shooting, in a manner as shown in FIG. 15B (step S301). Next, the control unit 2 composite tilted shot image data I1 shown in FIG. 16A and temporarily recorded horizontal image data I2 shown in FIG. 16B such that the degree of matching between the shot image data I1 and the horizontal image data I2 is maximized, thereby obtaining composite image data I3 shown in FIG. 16C (step S302). Composition of the image data is performed such that, for example, the positions of person region S match, as shown in FIG. 16C. After compositing the image data, the control unit 2 deletes a horizontal image data portion existing in the overlap portion between the horizontal image data and the shot image data, as shown in FIG. 17A (step S303). For example, as shown in FIG. 17B, when the horizontal image data of the person portion S is deleted, only the shot image data remains for the person portion S. As shown in FIG. 18A, the control unit 2 extracts the composite image data into a rectangular shape (step S304). For example, in FIG. 18B, the portion indicated by the broken line is deleted, and final composite image data is obtained. After that, the processing of FIG. 19 ends.

Upon determining that composition is unnecessary or impossible (NO in step S127), the control unit 2 records the shot image data I1 (step S130). After step S130, the process advances to step S108.

As described above, according to this embodiment, the image capturing apparatus 12 can make the optical axis of the image capturing optical system 1a provided in the rotatable image capturing unit 1d face the zenith independently of the tilt of the main body 10. When omnidirectional shooting is not performed, the image capturing apparatus 12 locks the rotatable image capturing unit 1d by the lock mechanism 106. This lock prevents the rotatable image capturing unit 1d from rotationally moving in accordance with the direction of gravity at the time of shooting, except in omnidirectional shooting.

In a situation where it is difficult for the user to confirm an object in the angle of view, the image capturing apparatus 12 projects guide light from the auxiliary light-emitting unit 7 to the object. This guide light projection is done to notify the user that the object fits in the angle of view. In a situation where the user shoots while grasping the image capturing apparatus 12 by the left hand, a touch portion used for a manipulation by the left hand is provided on the touch panel 3a. The user can manipulate the image capturing apparatus 12 by only the left hand by touching the touch portion. In addition, when the gravitational direction of image data does not match the gravitational direction at the time of shooting, the image capturing apparatus 12 can match the gravitational direction of image data with the gravitational direction at the time of shooting by composition processing.

First Modification

The first modification of the first embodiment will be described below with reference to FIG. 20. FIG. 20 shows a modification of the image capturing apparatus according to the first embodiment. An arrangement example according to the first modification includes an arrangement example different from the communication method between the rotatable image capturing unit 1d and the main body 10 according to the first embodiment and the charging method according to the first embodiment. Note that the same reference numerals as in the arrangement example described in the first embodiment denote the same parts, and a description thereof will be omitted. An operation example according to the first modification is the same as that of the first embodiment, and a description of the first modification will be omitted.

The main body 10 of the image capturing apparatus 12 according to the first modification includes the power supply circuit 110, a noncontact charge control unit 112, and a coil 113. The noncontact charge control unit 112 controls wireless power supply between the coil 113 on the main body side and a coil 118 on the rotatable image capturing unit side. For example, Qi® is used as the wireless power supply method. The power supply circuit 110 supplies a current to the coil 113. The coil 113 supplies power to the coil 118 on the side of the rotatable image capturing unit 1d.

The rotatable image capturing unit 1d includes an image processing IC 115, a wireless communication IC 114, a shield 117, and the coil 118. The image processing IC 115 further performs compression of image data. The amount of image data compressed by the image processing IC 115 is smaller than that before compression. The wireless communication IC 114 transmits the compressed image data to the side of the main body 10. Since compressed image data is transmitted, image data communication speeds up. The wireless communication IC 114 wirelessly transfers the image data compressed by the image processing IC 115 to a wireless communication IC 116 on the main body side. The amount of image data compressed by the image processing IC 115 is smaller than that before compression. For this reason, the wireless communication IC 114 can transmit the image data to the side of the main body 10 in a shorter time. The shield 117 suppresses electromagnetic noise generated in the wireless communication IC 114 and the like from mixing into an analog signal from the image sensor 101b. The coil 118 supplies power to the image processing IC 115 and the like.

As described above, the image capturing apparatus 12 according to the modification of an embodiment of the present invention can compress image data acquired by the rotatable image capturing unit 1d and transmit the compressed image data to the main body 10 by wireless communication. The image capturing apparatus 12 can wirelessly supply power from the main body 10 to the rotatable image capturing unit 1d.

Second Modification

Figure 21:
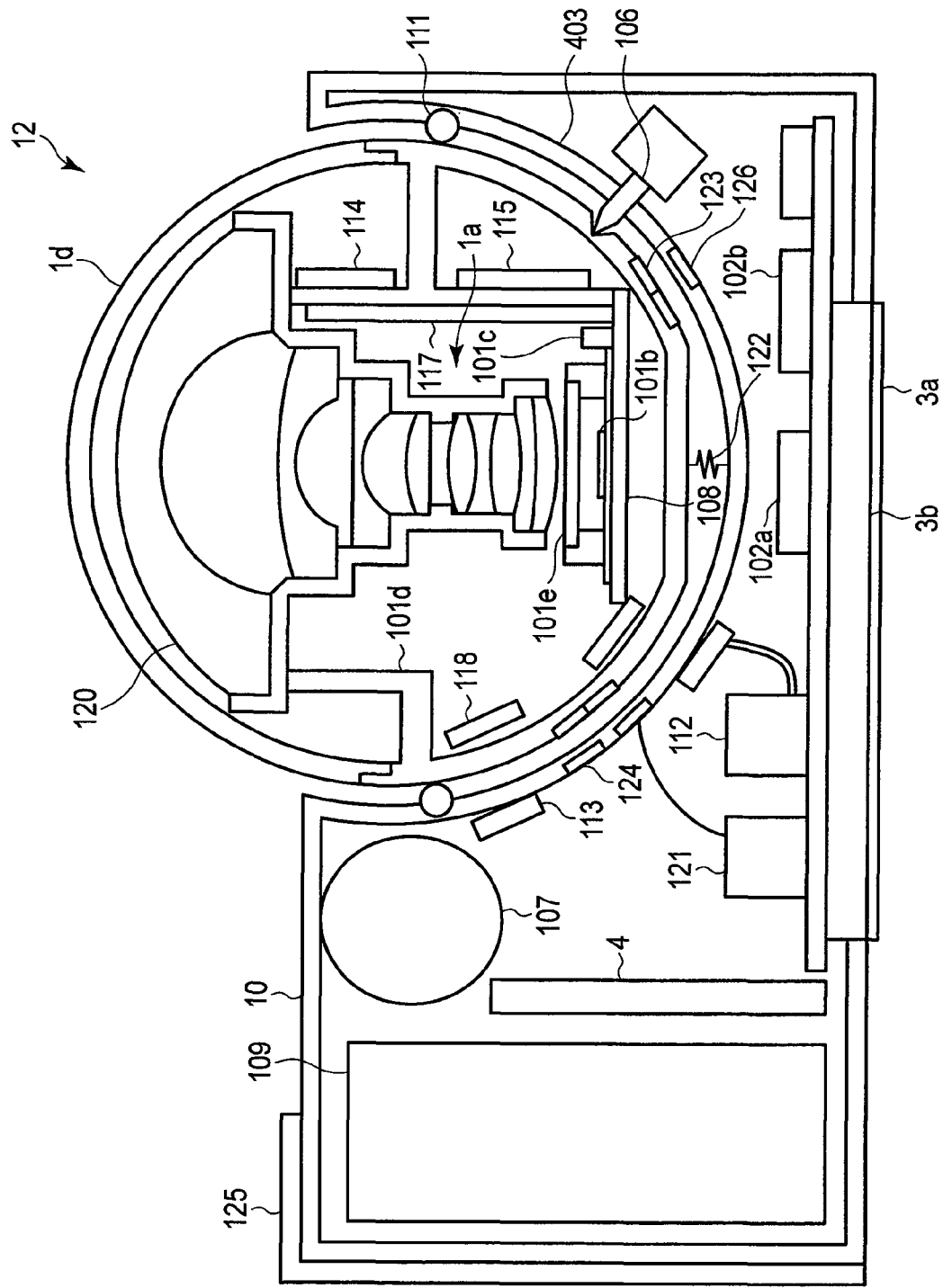
FIG. 21 is a view showing an example of the arrangement of an image capturing apparatus according to the second modification of an embodiment of the present invention.

The second modification of the image capturing apparatus according to an embodiment of the present invention will be described with reference to FIG. 21. The image capturing apparatus 12 according to the second modification can rotationally move the rotatable image capturing unit 1d by a method different from the first embodiment. Note that the same reference numerals as in the arrangement example described in the first embodiment denote the same parts, and a description thereof will be omitted.

The rotatable image capturing unit 1d includes a magnet 123 for voice coil motor, and a spring 122. When a current is supplied to a coil 124 for voice coil motor, the magnetic field generated by the magnet 123 for voice coil motor changes, and the voice coil motor generates a force in accordance with the change. The magnet 123 for voice coil motor and the coil 124 for voice coil motor will be referred to as a pair of voice coil motors hereinafter. The spring 122 has a function of limiting the moving range of the rotatable image capturing unit 1d to a range capable of omnidirectional shooting. The component having the function of limiting the moving range of the rotatable image capturing unit 1d to the range capable of omnidirectional shooting will be referred to as a rotation limiting mechanism.

The main body 10 includes a magnetic sensor 126, and a position control driver 121. The magnetic sensor 126 detects a change in the magnetic intensity concerning the voice coil motors. The position control driver 121 receives the detection result of the change in the magnetic intensity of the voice coil motors from the magnetic sensor 126, calculates the orientation of the rotatable image capturing unit 1d, and drives the voice coil motors in accordance with the orientation.

The voice coil motors will be described here in more detail with reference to FIGS. 22A and 22B. FIG. 22A is a view for explaining the operation of a single voice coil motor. The voice coil motor energizes the coil 124 for voice coil motor within the magnetic field of the magnet 123 for voice coil motor to generate a force. The force generated by the voice coil motor shown in FIG. 22A is unidirectional. Hence, to freely rotationally move the rotatable image capturing unit 1d, a plurality of voice coil motors are used, as shown in FIG. 22B.

In the second modification, the rotatable image capturing unit 1d can be made to freely rotate by the voice coil motors and the position control driver 121. The mechanism for making the rotatable image capturing unit 1d freely rotate need not always be a voice coil motor, and may be, for example, a spring or an elastic member. The mechanism for making the rotatable image capturing unit 1d freely rotate will be referred to as an autonomous moving unit.

Figure 23:
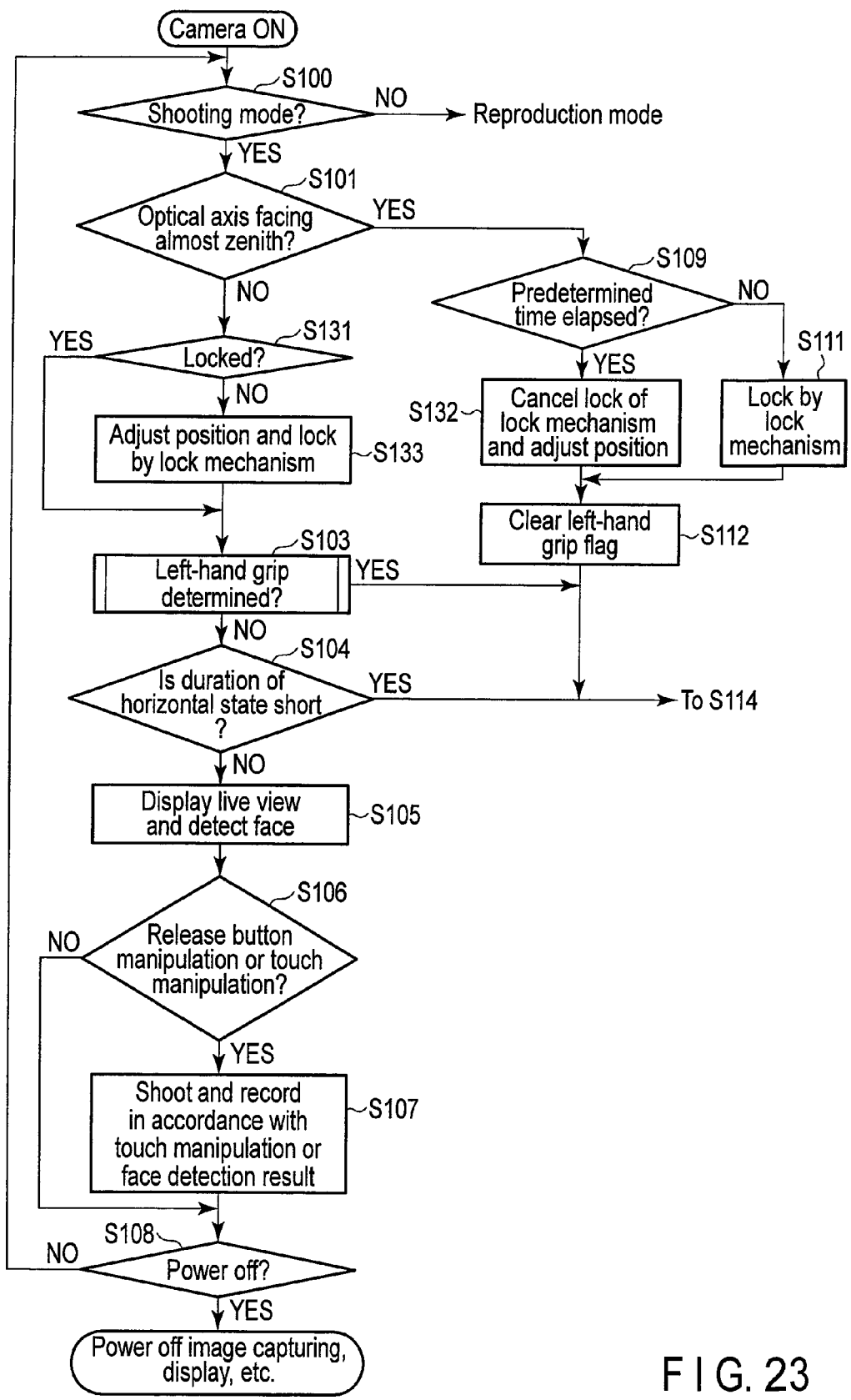
FIG. 23 is a flowchart for explaining an example of the operation of the image capturing apparatus according to the second modification.

The operation of the image capturing apparatus shown in FIG. 21 will be described here with reference to the flowchart of FIG. 23. A description of the same steps as in the flowchart of FIG. 6 will be omitted. Step S102 of the first embodiment is replaced with steps S131 and S133 of the second modification, as shown in FIG. 23. Step S110 of the first embodiment is replaced with step S132 of the second modification, as shown in FIG. 23. Referring to FIG. 23, upon determining that a predetermined time has elapsed in a state in which the optical axis faces the zenith (YES in step S109), the control unit 2 causes the lock mechanism 106 to unlock the rotatable image capturing unit 1d, and instructs the position control driver 121 to drive the voice coil motors. The position control driver 121 calculates the orientation of the rotatable image capturing unit 1d from the magnetic intensity detected by the magnetic sensor 126, and drives the voice coil motors based on the orientation such that the optical axis of the image capturing optical system 1a faces the zenith (step S132). Upon determining that the predetermined time has not elapsed in a state in which the optical axis faces the zenith (NO in step S109), the control unit 2 locks the rotatable image capturing unit 1d using the lock mechanism 106 (step S111).

Upon determining that the optical axis does not face the zenith (NO in step S101), the control unit 2 determines whether the rotatable image capturing unit 1d is locked by the lock mechanism 106 (step S131). Upon determining that the rotatable image capturing unit 1d is not locked by the lock mechanism 106 (NO in step S131), the control unit 2 causes the position control driver 121 to adjust the position of the rotatable image capturing unit 1d, and then causes the lock mechanism 106 to lock the rotatable image capturing unit 1d. After that, the control unit 2 determines whether the user grips the image capturing apparatus 12 by the left hand (step S103). Upon determining that the rotatable image capturing unit 1d is locked by the lock mechanism 106 (YES in step S131), the control unit 2 advances the process to determine whether the user grips the image capturing apparatus 12 by the left hand (step S103).

As described above, the image capturing apparatus 12 according to the second modification of an embodiment of the present invention includes a pair of voice coil motors in the main body 10 and the rotatable image capturing unit 1d. The image capturing apparatus 12 can adjust the orientation of the rotatable image capturing unit 1d without using the weight 101f by driving the pair of voice coil motors.

The rotatable image capturing unit 1d of the image capturing apparatus 12 has been described as a portable device such as an image capturing apparatus that is used while being gripped by a user's hand. However, the rotatable image capturing unit 1d may be incorporated as part of a helmet or glasses. The rotatable image capturing unit 1d may be incorporated in a wearable device. The rotatable image capturing unit 1d may be attached to a fixed device such as a bicycle, a motorcycle, a vehicle, a boat, a balloon, or a kite. A device with the rotatable image capturing unit 1d attached to a balloon or a kite is usable to shoot the earth's surface by making the optical axis of the image capturing optical system 1a of the rotatable image capturing unit 1d face the gravitational direction. The orientation of the optical axis of the image capturing optical system 1a is controlled by the attachment position of the weight 101f or the voice coil motors.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. An image capturing apparatus comprising:
a main body including a spherical portion having at least three support points; and
a rotatable image capturing unit including an image capturing optical system configured to form an image of an object, and an image sensor configured to convert object light from the image capturing optical system into image data, the rotatable image capturing optical system being rotatably arranged in the spherical portion of the main body and supported by the at least three support points in such a manner that a space is provided between the rotatable image capturing unit and the main body,
wherein:
a gravitational point of the rotatable image capturing unit agrees with a center of gravity of a hypothetical polygonal plane formed by connecting the at least three support points;
the image sensor is located closer to the spherical portion of the main body than the hypothetical polygonal plane in a direction perpendicular to the hypothetical polygonal plane;
the rotatable image capturing unit is rotatably arranged in the spherical portion of the main body while being supported by the at least three support points in such a manner that the space is maintained between the rotatable image capturing unit and the main body; and
the rotatable image capturing unit further comprises a rotation regulation pin projecting from the rotatable image capturing unit toward the main body, and the main body further comprises a rotation regulation portion annularly projecting from the main body toward the rotatable image capturing unit, the rotation regulation pin being limited so as to move inside the rotation regulation unit.

2. The apparatus according to claim 1, wherein the rotatable image capturing unit includes an image processing circuit configured to compress the image data.

3. The apparatus according to claim 1, wherein the rotatable image capturing unit includes a wireless communication circuit configured to wirelessly transmit the image data to the main body.

4. The apparatus according to claim 1, wherein the rotatable image capturing unit includes a shield configured to block electromagnetic noise.

5. The apparatus according to claim 1, further comprising a noncontact power supply control unit configured to wirelessly supply power to a circuit in the rotatable image capturing unit.

6. The apparatus according to claim 5, wherein the noncontact power supply control unit comprises a power transmission unit provided in the main body, and a power reception unit provided in the rotatable image capturing unit and configured to receive power transmitted from the power transmission unit.

7. The image capturing apparatus according to claim 1, further comprising:
an autonomous moving unit configured to rotationally move the rotatable image capturing unit supported by the at least three support points and to make an optical axis of the image capturing optical system face a zenith.

8. The apparatus according to claim 1, further comprising:
at least three rolling elements provided between the main body and the rotational image capturing unit, and
wherein the at least three support points are located at contact points between the at least three rolling elements and the rotational image capturing unit.

9. The apparatus according to claim 8, wherein the at least three rolling elements comprise three balls.

10. The apparatus according to claim 1, wherein an optical axis of the image capturing optical system passes through the gravitational point of the rotatable image capturing unit, and the optical axis of the image capturing optical system agrees with a direction of a gravitational force regardless of a position of the main body.

11. The apparatus according to claim 7, further comprising a noncontact power supply control unit configured to wirelessly supply power to a circuit in the rotatable image capturing unit.

12. The apparatus according to claim 11, wherein the noncontact power supply control unit comprises a power transmission unit provided in the main body, and a power reception unit provided in the rotatable image capturing unit and configured to receive power transmitted from the power transmission unit.

13. The apparatus according to claim 1, wherein the at least three support points comprise rotation promoting portions configured to smoothly rotationally move the rotatable image capturing unit.

* * * * *